(12) United States Patent
Mehta et al.

(10) Patent No.: US 12,093,424 B2
(45) Date of Patent: *Sep. 17, 2024

(54) DATA AGGREGATION AND CLASSIFICATION MODALITIES FOR A DATA SHARING PLATFORM

(71) Applicant: Wells Fargo Bank, N.A., San Francisco, CA (US)

(72) Inventors: Chintan Mehta, San Ramon, CA (US); Jason Strle, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,239

(22) Filed: Apr. 7, 2023

(65) Prior Publication Data

US 2023/0244813 A1  Aug. 3, 2023

Related U.S. Application Data

(63) Continuation of application No. 17/316,539, filed on May 10, 2021, now Pat. No. 11,657,180.

(51) Int. Cl.
*G06F 21/62* (2013.01)
*G06F 3/0482* (2013.01)
*H04L 67/10* (2022.01)

(52) U.S. Cl.
CPC ........ *G06F 21/6245* (2013.01); *G06F 3/0482* (2013.01); *H04L 67/10* (2013.01); *G06F 2221/2145* (2013.01)

(58) Field of Classification Search
CPC .............. G06F 21/6245; G06F 3/0482; G06F 2221/2145; H04L 67/10; H04L 67/306
See application file for complete search history.

(56) References Cited

U.S. PATENT DOCUMENTS

| 8,370,952 B1 | 2/2013 | Wieder |
| 8,656,043 B1 | 2/2014 | Wieder |

(Continued)

FOREIGN PATENT DOCUMENTS

| CN | 112751821 A | 5/2021 |
| KR | 20100045633 A | 5/2010 |

OTHER PUBLICATIONS

IP.com, article titled "Inefficiencies in Digital Advertising Markets" by Gordon et al. 2/18/219, pp. 1-2.

(Continued)

*Primary Examiner* — Cao H Nguyen
(74) *Attorney, Agent, or Firm* — Foley & Lardner LLP

(57) ABSTRACT

A system includes a first application programming interface (API), a second API, and a third API. The first API is configured to receive an input to configure a data sharing permission for a data sharing service. The second API is configured to gather data of a user and receive, from a plurality of experience providers, an API response containing data of the user, and aggregate the data of the user. The third API is configured to classify the aggregated data according to a classification scheme where the classification scheme comprises rules for multiple levels of granularity such that the data of the user is classified for a plurality of overlapping data categories, generate a user data corpus comprising the classified aggregated data of the user, and provide the user with selectable data categories based on the user data corpus.

20 Claims, 11 Drawing Sheets

(56) References Cited

U.S. PATENT DOCUMENTS

| | | | |
|---|---|---|---|
| 9,053,299 | B2 | 6/2015 | Wieder |
| 9,356,918 | B2 | 5/2016 | Tsui et al. |
| 9,405,930 | B2 | 8/2016 | Vestevich |
| 10,402,549 | B1 | 9/2019 | Newstadt et al. |
| 11,063,952 | B2 | 7/2021 | Boland |
| 11,140,240 | B1 | 10/2021 | Brown et al. |
| 11,232,187 | B2 | 1/2022 | Bruno et al. |
| 11,386,223 | B1 | 7/2022 | Fakhraie et al. |
| 11,457,079 | B1 | 9/2022 | Mehta et al. |
| 2007/0198870 | A1 | 8/2007 | Cheng et al. |
| 2008/0040249 | A1 | 2/2008 | Re et al. |
| 2011/0022681 | A1 | 1/2011 | Simeonov |
| 2013/0211925 | A1 | 8/2013 | Holland |
| 2013/0268357 | A1* | 10/2013 | Heath ................. G06Q 10/10 726/26 |
| 2015/0348024 | A1 | 12/2015 | Asokan et al. |
| 2016/0012465 | A1 | 1/2016 | Sharp |
| 2016/0034935 | A1 | 2/2016 | Neb |
| 2016/0255139 | A1 | 9/2016 | Rathod |
| 2016/0300231 | A1 | 10/2016 | Shavell et al. |
| 2017/0034176 | A1 | 2/2017 | Qi et al. |
| 2017/0140174 | A1 | 5/2017 | Lacey et al. |
| 2018/0350144 | A1 | 12/2018 | Rathod |
| 2019/0222560 | A1 | 7/2019 | Ford et al. |
| 2020/0145225 | A1* | 5/2020 | Faye ................. H04L 9/3247 |
| 2021/0192651 | A1 | 6/2021 | Groth et al. |
| 2021/0350488 | A1 | 11/2021 | Hossain |
| 2021/0352064 | A1 | 11/2021 | Tsarfati et al. |
| 2021/0352088 | A1 | 11/2021 | Adams et al. |
| 2021/0397987 | A1 | 12/2021 | Dixit et al. |
| 2022/0019629 | A1 | 1/2022 | Kavuri |
| 2022/0066796 | A1 | 3/2022 | Koren et al. |
| 2022/0164470 | A1 | 5/2022 | Obaidi |
| 2022/0173891 | A1 | 6/2022 | Kim et al. |
| 2022/0191026 | A1 | 6/2022 | Perpetua et al. |

OTHER PUBLICATIONS

Komanduri et al., Ad Choices? Compliance with Online Behavioral Advertising Notice and Choice Requirements, Oct. 7, 2011, https://www.cylab.cmu.edu, 28 pages (Year: 2011).

SignNow, eSignature API: Developer Center, Guides and Support, Jan. 10, 2018, https://www.signnow.com, 8 pages (Year: 2018).

Suzie et al., "Rethinking Authorization Management of Web-APIs", Mar. 1, 2020, IEEE, 2020 IEEE International Conference on Pervasive Computing and Communications (PerCom) (pp. 1-10) (Year: 2020).

* cited by examiner

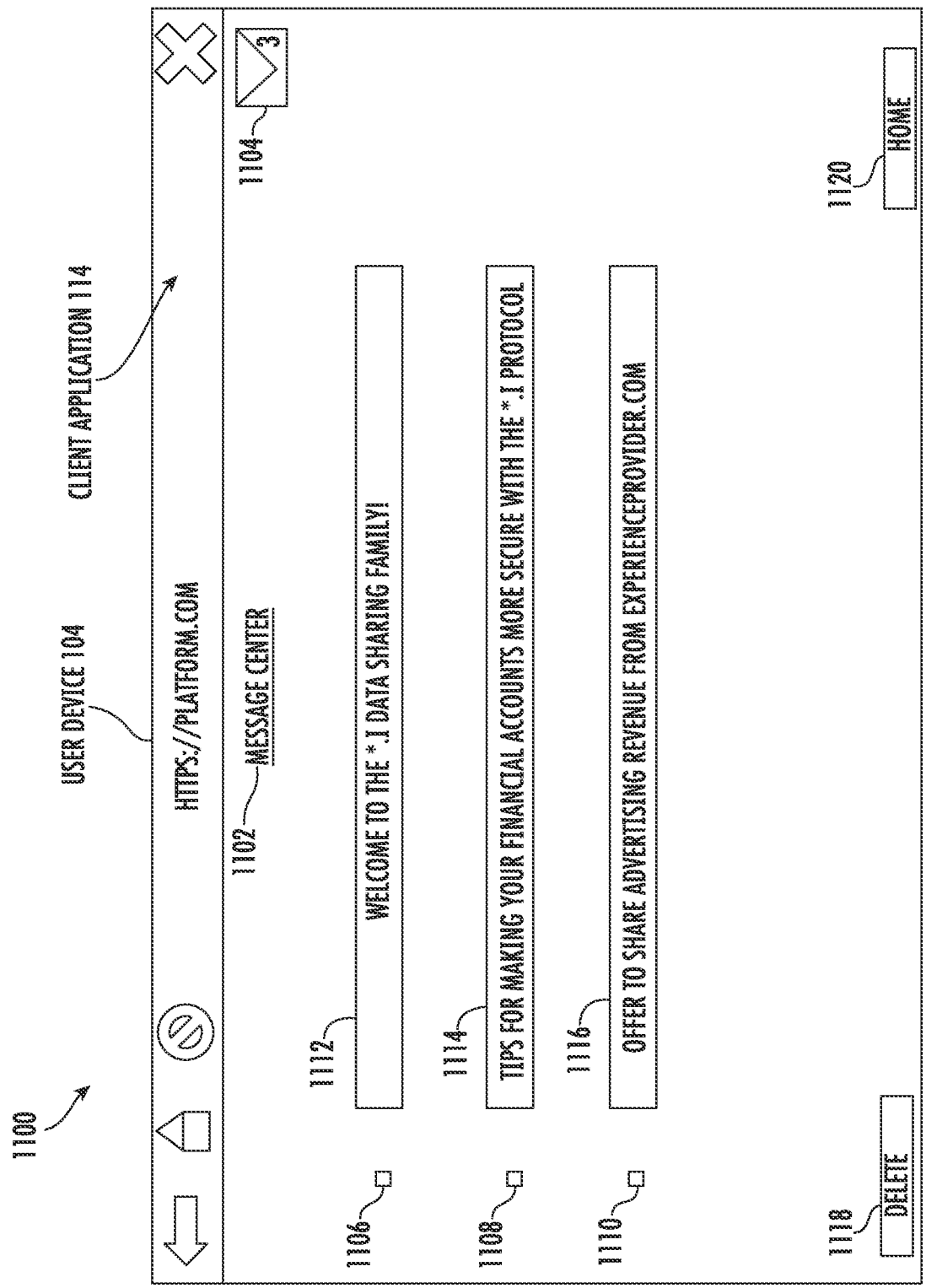

DATA AGGREGATION AND CLASSIFICATION MODALITIES FOR A DATA SHARING PLATFORM

CROSS-REFERENCE TO RELATED APPLICATION AND CLAIM OF PRIORITY

This application is a continuation of U.S. patent application Ser. No. 17/316,539, filed on May 10, 2021, entitled "Data Aggregation And Classification Modalities For A Data Sharing Platform," which is incorporated herein by reference in its entirety and for all purposes.

TECHNICAL FIELD

The present application relates to data sharing. More particularly, the present application relates to configuring permission settings with a platform, which dictate how user data is shared with experience providers.

BACKGROUND

User data has become one of the most sought after resources in the modern digital world. From websites to IoT devices, a wide variety of computing-enabled components are constantly tracking and cataloging user data. Users may come to find their data in the hands of unintended actors, and contrarily, not in the hands of intended recipients. Furthermore, some intended recipients of a user's data may use the user's data contrary to the user's wishes. Furthermore, users typically do not receive any benefit when an entity shares the user's data with another entity.

SUMMARY

One embodiment relates to a system. The system includes a user data repository containing data relating to a plurality of users. The system includes a first application programming interface (API). The first API is configured to receive, from a user device associated with a user, an input of the user to configure a data sharing permission for a data sharing service of the system. The system includes a second API. The second API is configured to gather, from a plurality of computing systems associated with the system, data of the user. The second API is configured to request, from a plurality of experience providers associated with the data sharing service of the system, data of the user according to the data held by each experience provider from the plurality. The second API is configured to receive, from the plurality of experience providers, an API response containing the data of the user. The second API is configured to aggregate the data of the user gathered from the plurality of computing systems associated with the system and the data of the user received from the plurality of experience providers. The system includes a third API. The third API is configured to classify the aggregated data of the user according to a classification scheme. The third API is configured to generate a user data corpus comprising the classified data of the user. The third API is configured to store the user data corpus in the user data repository. The third API is configured to provide the user with selectable data categories responsive to the input to configure the data sharing permission, the selectable data categories based on the user data corpus.

Another embodiment relates to a method. The method includes receiving, by a first application programming interface (API) of a platform computing system and from a user device associated with a user, an input of the user to configure a data sharing permission for a data sharing service of the platform computing system. The method includes gathering, by a second API of the platform computing system and from a plurality of computing systems associated with the platform computing system, data of the user. The method includes requesting, by the second API and from a plurality of experience providers associated with the data sharing service of the platform computing system, data of the user according to the data held by each experience provider from the plurality. The method includes receiving, by the second API and from the plurality of experience providers, an API response containing the data of the user. The method includes aggregating, by the second API, the data of the user gathered from the plurality of computing systems associated with the platform computing system and the data of the user received from the plurality of experience providers. The method includes classifying, by a third API of the platform computing system, the aggregated data of the user according to a classification scheme. The method includes generating, by the third API, a user data corpus comprising the classified data of the user. The method includes storing, by the third API, the user data corpus in a user data repository. The method includes providing, by the third API, the user with selectable data categories responsive to the input to configure the data sharing permission, the selectable data categories based on the user data corpus.

Another embodiment relates to a non-transitory computer readable media having computer-executable instructions embodied therein that, when executed by a processor of a server system, cause the server system to perform operations. The operations include receiving, by a first application programming interface (API) of the server system and from a user device associated with a user, an input of the user to configure a data sharing permission for a data sharing service of the server system. The operations include gathering, by a second API of the server system and from a plurality of computing systems associated with the server system, data of the user. The operations include requesting, by the second API and from a plurality of experience providers associated with the data sharing service of the server system, data of the user according to the data held by each experience provider from the plurality. The operations include receiving, by the second API and from the plurality of experience providers, an API response containing the data of the user. The operations include aggregating, by the second API, the data of the user gathered from the plurality of computing systems associated with the server system and the data of the user received from the plurality of experience providers. The operations include classifying, by a third API of the server system, the aggregated data of the user according to a classification scheme. The operations include generating, by the third API, a user data corpus comprising the classified data of the user. The operations include storing, by the third API, the user data corpus in a user data repository. The operations include providing, by the third API, the user with selectable data categories responsive to the input to configure the data sharing permission, the selectable data categories based on the user data corpus.

BRIEF DESCRIPTION OF THE FIGURES

FIG. 11 is an illustration of a dynamic graphical user interface for a message center displayed on a user device, according to an example embodiment.

Figure 1:
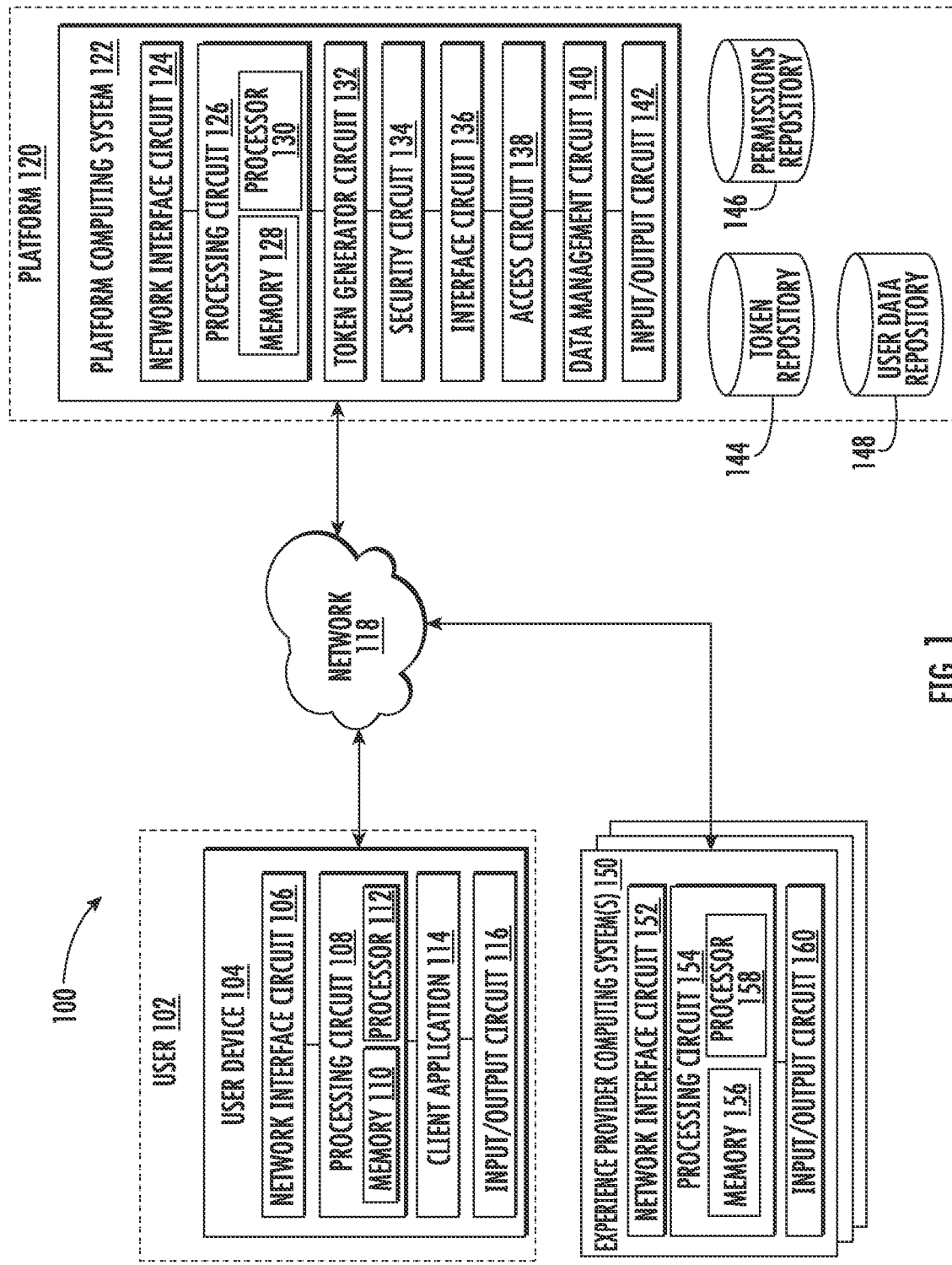
FIG. 1 is a schematic diagram of a data sharing and permissioning computing system 100, according to an example embodiment.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

According to example embodiments described herein, systems and methods are described that includes users, experience providers and a platform. The experience providers (which exist today) provide some sort of experience for the user, such as social networking (e.g., a social or professional networking website), shopping (e.g., an online retailer or auction website), news or entertainment (e.g., a streaming service), and so on. Experience providers often desire to have information about the consumer so that they can customize the experience that is provided to meet the user's preferences. Typically, whenever the user interacts with the experience provider, the experience provider collects data about the user's preferences and, over time, builds up a corpus of data about the user. The more the user interacts with a particular experience provider, the greater the depth of data that the experience provider can gain about the user. Typically, while the user may have consented to a privacy policy or other agreement of the experience provider, the user may have little control over how that data is used. Various improvements to computer hardware and data security are described herein. Through the systems and methods provided, a user is able to choose who can see their data, use their data, and how experience providers monetize their viewership. Accordingly, by handing control of personal data back to the user, the systems and methods described herein improve data security by reducing the exposure of sensitive user data to both malicious actors and unintended experience providers. The unintended experience providers may include any variety of experience providers that access personal data of a user without the knowledge or consent of the user, such as an experience provider website accessing the personal data of the user in order to serve targeted advertisements that the user does not wish to be shown.

As will be appreciated, some experience providers are larger than others. For example, a large social networking website may have a large number of users that interact with the experience provider, and many of those users may interact with the experience provider on a relatively frequent basis. Conversely, other experience providers may be relatively small, having far fewer users, and having users that tend to interact with the experience provider on a relatively infrequent basis.

According to example embodiments, a platform is provided that interconnects the users and the experience providers through a network of application programming interfaces (APIs) implemented by the platform and the experience providers. Users may sign up to use the platform as a service to help the user control their own data (user preferences, insights about the customer, and so on). Such control may include how the data is shared, who it is shared with, how it is monetized, and so on. Such control may be implemented on a real-time basis.

For the experience providers, according to example embodiments, the platform provides a mechanism to aggregate user data from the experience providers that participate in the service. In various embodiments, the experience providers may retain the data they have collected, and the APIs provide a mechanism for data sharing to effectively provide an aggregated data set. Hence, smaller experience providers may be given access to user data collected by other experience providers, potentially subject to the real-time approval of the user. In effect, this may help to level the playing field between large experience providers (which have a large corpus of user data) and small experience providers (which do not have a large internal corpus of data).

Additionally, for the experience providers, the platform may assist with implementing controls over access to the user data in a manner that comports with the user's preferences. For an experience provider, controlling how user data is utilized and shared (e.g., for purposes of complying with regulatory requirements) requires a layer of software development above and beyond that which is needed for purposes of providing the features and functionality that attract the user to the website in the first place. Such additional layer may comprise tools for maintaining audit trails, processes and procedures relating to data retention, and so on. In various embodiments, the platform provides a centralized system for implementing controls over access to the user data in a manner that comports with the user's preferences, thereby offloading some or all of this responsibility from experience providers that participate in the service to the platform. Hence, this allows the experience providers to focus on building out the particular features and functionality that attract users to their website. This benefit may be of interest to large and small experience providers alike.

In various embodiments, for a large experience provider, the platform may provide a mechanism for users to specify the types of messages (e.g., advertisements) that they want to receive. For example, some users may not wish to receive any politically-oriented messages. Other users may only wish to receive certain types of political messages. To satisfy these preferences, in various embodiments, the experience providers may be tasked with classifying the content they provide according to a classification scheme. The classification scheme may be provided by the platform, by the experience provider, or by another entity (e.g., by a standards-setting organization). The classification scheme may be at various levels of granularity. For example, a high level classification may be political content, which may then be further broken down into further layers of sub-classifications (e.g., based on political issues, political orientation, branch of government, geographic region, and so on). When providing content to the user, the experience provider may then determine what types of political content the user is willing to view, if any. By participating in the platform, the experience provider may offload the duty of being the arbiter of what messages users receive and instead be a pure messaging website. To the extent an experience provider accurately classifies its content in accordance with an accepted classification scheme, and provides content to the user in accordance with the user's preferences, the risk associated with providing such content to the user is substantially reduced or eliminated.

In various embodiments, users that sign up for the service may create a digital identity proxy that the user may then use to interact with the experience providers in real time. For example, the digital identity proxy may have the general form "_____.xxx." As a more specific example, the digital identity proxy for a particular user may be "johndoe4371". The digital identity proxy for another user may be "robertmulligan15.i". In both cases, the digital identity proxy uniquely identifies those two particular users. When the user visits an experience provider website, the user uses their ".i" digital identity proxy as a login credential and, on this basis, the experience provider recognizes the user as being someone that utilizes the services of the platform. With this in mind, the experience provider recognizes that it may send API calls to the platform to gain additional information about the user in real time (i.e., while the user is enjoying the features/functionality of the experience provider web site, as opposed to in an offline manner). In various embodiments, the platform and the experience providers all provide various APIs that facilitate real-time interaction between the various entities. In that vein, for the experience providers, the APIs may be provided based on template APIs developed by the platform and reused by the experience provider, or the APIs may be custom-written according to an API documentation of the platform. In various embodiments, the user is able to control the access of the experience provider as part of the afore-mentioned real time process. Again, with the user in direct real time control of how the user's data is accessed, the privacy and other regulatory concerns of the experience provider around sharing of user data are substantially reduced or eliminated.

In various embodiments, the customer may access an application or web site of the platform to set preferences as to how their data is to be shared. In various embodiments, the platform may be provided by an entity that already has a significant amount of information pertaining to a set of users, such as by a financial institution or consortium of financial institutions. Through the application, the user may then "turn on" or "turn off" various items of data that may be shared with experience providers.

In various embodiments, such preferences may also be received from the user in real time (e.g., while the user is visiting an experience provider website). In various embodiments, the platform is interconnected with various payment rails (e.g., Real Time Payments, ACH, Zelle, Venmo, and so on) that may be used to make payments to the user as a result of decisions made by the user concerning the sharing of their data. Hence, an experience provider that wishes to access certain data of the user may offer to pay the user a modest sum to gain access to that data (e.g., in order to improve targeted advertising). For example, if the user's generic preferences state that certain data is not to be shared, an experience provider may send an offer to request access to the data. In response to the user approving such access, in real time, the experience provider may make a payment of the modest sum to the user's bank account. In various embodiments, and in a related vein, the user may be offered higher payments to the extent that the user agrees to expose more of their data (whether the approval is in real time or not). In an example where a user has specified that they do not wish to receive any politically-oriented messages, an experience provider website may wish to offer the user payment for receiving such messages, on the assumption that the user is an "independent" (or when other user data suggests the user is an independent), and thus a highly desirable target for political messages. Hence, due to such features as the real time integration and API interconnections, the user is able to monetize the user's own data in a way not previously possible.

In various embodiments, the experience providers may also be brick and mortar establishments. For example, a user may make an online reservation at a restaurant using the user's digital identity proxy. The restaurant may then send API requests to the platform to learn more about the user's dining preferences. Hence, the platform may also provide merchant services to brick and mortar institutions in the same manner as other experience providers.

Accordingly, the systems and methods provided tangibly improve computer hardware. Typically, user data is stored in a plethora of locations, contained in pieces across a myriad of experience providers that a user interacts with over their lifetime. Furthermore, that data may be frequently distributed, incompletely, amongst the various experience providers. Through the innovations described herein, the user data may be aggregated, protected, and distributed by a single provider, thereby reducing the inefficient, incomplete distributions. These inefficient, incomplete distributions require power consumption, CPU clock cycles, memory allocation, and network bandwidth. Furthermore, these resource expenditures occur on both sides of the transmission. That is, the transmission issuing system must expend resources and the receiving system, likewise, must expend resources to receive, interpret, and act upon the transmission. Accordingly, by reducing the total amount of transmissions occurring on behalf of user data requests, the entire computational ecosystem is impacted and improved. These and other features and benefits are described more fully herein.

Furthermore, it will be appreciated that the digital identity proxy and secure-pop up login protocols described herein provide a specific technical improvement to the technological fields of data security and data distribution. Through the systems and methods of the present application, a user may associate their data with a specific experience provider, enforce a set of permissions for the experience provider (including what data may be used and what content may be served by the experience provider), and also dynamically adjust these associations and permissions in real-time such that data distribution may be halted with a single input of the user. The innovations described herein are directed towards safeguarding user data, distributing the user data according to a prerogative of the user, protecting and enforcing experience provider content served to the user, and other data sharing and permissioning tangential processes, such as the monetization of the user data. These concepts are inextricably tied to computer technology and distinct from the types of concepts found by the courts to be abstract.

Additionally, through the sharing and enforcing of the permission set associated with the user, the experience of the user while accessing experience provider content and devices is greatly improved. As an example, consider a user accessing a smart car and subsequently logging into the smart car computing system with a data sharing and permissioning protocol of a platform (e.g., as discussed herein). The smart car is then enabled to access a wide variety of data and preferences of the user, and formulate a custom experience based on the data and preferences. For example, the smart car may adjust a climate control system (e.g., to provide the ideal temperature of the user), establish a self-driving destination, and perform predictive operations (e.g., pre-order a favorite drink of the user at the self-driving destination). Accordingly, the experience of the user is greatly improved, as the smart car is enabled (e.g., by the systems and methods described herein) to integrate with the user in a harmonious and convenient manner (e.g., in order to provide custom experiences). Furthermore, the performance of the smart car is improved by reducing the number of interactions with the user (e.g., destination prompts, climate preference prompts, entertainment selections and adjustments, etc.) such that tangible reductions in both clock cycles and memory are achieved (e.g., as each interactive operation with the user costs resources). Thus, by reducing the number of interactions required by the user, the user is enabled to focus on the automated driving experience and intercede when required (e.g., the user is able to more rapidly react to a traffic crisis rather than being distracted by an interface of the smart car).

Referring now to FIG. 1, a schematic diagram of a data sharing and permissioning computing system 100 is shown, according to an example embodiment. The data sharing and permissioning computing system 100 includes a user device 104, a platform computing system 122, and an experience provider computing system(s) 150. The user device 104, the platform computing system 122, and the experience provider computing system(s) 150 are each communicably coupled and configured to exchange information over a network 118, which may include one or more of the Internet, cellular network, Wi-Fi, Wi-Max, a proprietary banking network, a proprietary retail or service provider network, or other type of wired or wireless network.

The user device 104 may be a computing device associated with a user 102 (e.g., owned by, used by, etc.). The user device 104 may be or include a mobile phone, a tablet, a laptop, a desktop computer, an IoT-enabled device (e.g., an IoT-enabled smart car), a wearable device, a virtual/augmented reality (VR/AR) device, and/or other suitable user computing devices capable of accessing and communicating using local and/or global networks (e.g., the network 118). Wearable computing devices refer to types of devices that an individual wears, including, but not limited to, a watch (e.g., a smart watch), glasses (e.g., eye glasses, sunglasses, smart glasses, etc.), bracelet (e.g., a smart bracelet), etc.

The user 102 may be a customer or client of the platform 120 associated with the platform computing system 122 (e.g., an account holder). In some embodiments, the user 102 may not have a previous relationship with the platform 120, and therefore, may only be a user of the features recited herein (e.g., with regard to the data sharing and permissioning computing system 100). Accordingly, the user 102 may be an individual, a representative(s) of a small or large business entity, any customer of the provider, and/or any user registered to utilize the data sharing and permissioning computing system 100.

The user device 104 is shown to include a network interface circuit 106, a processing circuit 108, a client application 114, and an input/output circuit 116. The network interface circuit 106 is structured to establish connections with other computing systems (e.g., the platform computing system 122, the experience provider computing system(s) 150, etc.) via the network 118. Accordingly, the network interface circuit 106 enables the user device 104 to transmit and/or receive information to and/or from the platform computing system 122 and the experience provider computing system(s) 150 over the network 118. The network interface circuit 106 includes program logic that facilitates connection of the user device 104 to the network 118. For example, the network interface circuit 106 may include a combination of wireless network transceivers (e.g., a cellular modem, a NFC transceiver, a Bluetooth transceiver, a Wi-Fi transceiver, etc.) and/or a wired network transceivers (e.g., an Ethernet transceiver). In some arrangements, the network interface circuit 106 includes the hardware and machine-readable media sufficient to support communication over multiple channels of data communication. Further, in some arrangements, the network interface circuit 106 includes cryptography capabilities to establish a secure or relatively secure communication session in which data communicated over the session is encrypted.

The processing circuit 108 includes a memory 110 and a processor 112. The memory 110 may be one or more memory or storage devices (e.g., RAM, ROM, Flash memory, hard disk storage) for storing data and/or computer code for completing and/or facilitating the various processes described herein. Memory 110 may be or include non-transient volatile memory, non-volatile memory, and non-transitory computer storage media. Memory 110 may include database components, object code components, script components, or other types of information structured for supporting the various activities and information structures described herein. The memory 110 may be coupled to the processor 112 and include computer code or instructions for executing one or more processes described herein. The processor 112 may be implemented as one or more processors, application specific integrated circuits (ASICs), field programmable gate arrays (FPGAs), a group of processing components, or other suitable electronic processing components. As such, the user device 104 is configured to run a variety of application programs and store associated data in the memory 110. One such application may be the client application 114.

The user device 104 includes a client application 114 (also referred to herein as the platform client application 114) that is provided by and coupled to the platform computing system 122. In some arrangements, the client application 114 may be a standalone application or be incorporated with an existing application of the user device 104 (e.g., integrated into a mobile banking application, a service provider application, etc.). The client application 114 may be downloaded by the user device 104 prior to its usage, hard coded into the memory 110 of the user device 104, or be a network-based or web-based interface application such that the platform computing system 122 may provide a web browser to access the application, which may be executed remotely from the user device 104. In the example shown, the client application 114 is downloaded to the user device 104 and provided by the platform computing system 122 via, for example, an app store for download. In the example shown, the client application 114 is structured as a data sharing and permission application (e.g., to assign and customize data sharing and permission preferences of the user 102). The client application 114 may be developed and maintained (e.g., provided with software updates on a regular or semi-regular basis) by the platform 120 using the platform computing system 122. Accordingly, the user device 104 may include software and/or hardware capable of implementing a network-based or web-based application. For example, in some instances, the client application 114 includes software such as HTML, XML, WML, SGML, PHP (Hypertext Preprocessor), CGI, and like languages.

In the latter web-based instance, the user 102 may have to log onto or access the web-based interface before usage of the application. Further, and in this regard, the client application 114 may be supported by the platform computing system 122 via one or more servers, processors, network interface circuits, etc. that transmit applications for use to the user device 104. Furthermore, prior to use of the client application 114 and/or at various points throughout the use of the client application 114, the user 102 may be required to provide various authentication information or log-in credentials (e.g., a password, a personal identification number (PIN), a fingerprint scan, a retinal scan, a voice sample, a face scan, any other type of biometric security scan) to ensure that the user 102 associated with the user device 104 is authorized to use the client application 114.

The client application 114 is structured to provide displays (e.g., generated by the interface circuit 136 of the platform computing system 122 and transmitted over the network 118) to the user 102 of the user device 104 in order to provide information pertaining to data sharing preferences (e.g., as described further herein). Accordingly, the user 102 may manage data sharing and permission settings that are maintained and distributed by the platform 120, via the client application 114.

The input/output circuit 116 is structured to receive communications from and provide communications to the user 102. In this regard, the input/output circuit 116 is structured to exchange data, communications, instructions, etc. with an input/output component of the user device 104. In one embodiment, the input/output circuit 116 includes an input/output device. In another embodiment, the input/output circuit 116 includes communication circuitry for facilitating the exchange of data, values, messages, and the like between an input/output device and the components of the user device 104. In yet another embodiment, the input/output circuit 116 includes machine-readable media for facilitating the exchange of information between an input/output device and the components of the user device 104. In still another embodiment, the input/output circuit 116 includes a combination of hardware components, communication circuitry, and machine-readable media.

For example, in some embodiments, the input/output circuit 116 may include suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or manipulation purposes. That is, the input/output circuit 116 provides an interface for the user 102 to interact with various applications (e.g., the client application 114) accessed by the user device 104.

Still referring to FIG. 1, the platform computing system 122 is associated with (e.g., owned, managed, and/or operated by) the platform 120. In the example depicted, the platform 120 is a financial institution capable of providing one or more products and services, such as the providing of various accounts, such as a demand deposit account, lending, money transfers, issuing credit and/or debit cards, wealth management, etc. Thus, the associated platform computing system 122 is structured to provide or otherwise facilitate providing the one or more products and services to customers. Additionally, the platform computing system 122 is structured to maintain, control access to, and provide data of the user 102 to experience provider computing systems 150 (e.g., as described further below, with reference to FIGS. 2 and 3). As depicted, the platform computing system 122 is a backend computer system. The platform computing system 122 may be implemented using a computing system, such as a discrete server, a group of two or more computing devices/servers, a distributed computing network, a cloud computing network, and/or another type of computing system capable of accessing and communicating using local and/or global networks (e.g., the network 118).

The platform computing system 122 includes a network interface circuit 124, a processing circuit 126, a token generator circuit 132, a security circuit 134, an interface circuit 136, an access circuit 138, a data management circuit 140, and an input/output circuit 142. The platform computing system 122 also includes a token repository 144, a permissions repository 146, and a user data repository 148. In an alternate embodiment, the token repository 144, and/or the permissions repository 146, and/or the user data repository 148 may be a part of another computing system, accessed as needed by the platform computing system 122.

The network interface circuit 124 is structured to establish communicable connections with other computing systems (e.g., the user device 104, the experience provider computing system(s) 150, other computing systems, etc.), by way of the network 118. The network interface circuit 124 may include program logic that facilitates connection of the platform computing system 122 to the network 118. For example, the network interface circuit 124 may include a combination of a wireless network transceivers (e.g., a NFC transceiver, a Bluetooth transceiver, a Wi-Fi transceiver, etc.) and/or a wired network transceiver (e.g., an Ethernet transceiver). In some arrangements, the network interface circuit 124 includes the hardware and machine-readable media sufficient to support communication over multiple channels of data communication. Further, in some arrangements, the network interface circuit 124 includes cryptography capabilities to establish a secure or relatively secure communication session in which data communicated over the session is encrypted.

The processing circuit 126 includes a memory 128 and a processor 130. The memory 128 may be one or more devices (e.g., RAM, ROM, Flash memory, hard disk storage) for storing data and/or computer code for completing and/or facilitating the various processes described herein. Memory 128 may be or include non-transient volatile memory, non-volatile memory, and non-transitory computer storage media. Memory 128 may include database components, object code components, script components, or other types of information structured for supporting the various activities and information structures described herein. The memory 128 may be coupled to the processor 130 and include computer code or instructions for executing one or more processes described herein. The processor 130 may be implemented as one or more server processors, application specific integrated circuits (ASIC), field programmable gate arrays (FPGAs), digital signal processor (DSP), microprocessors, or other suitable electronic processing components. The server(s) or server computer may be geographically dispersed relative to other server(s) of the platform computing system 122. Further, there may be a variety of different types of server(s) included in the computing system 122 (e.g., application server, database server, catalog sever, virtual private network (VPN) server, communications server, web server, and so on). The memory device may be included with the server(s). The platform computing system 122 is structured to run a variety of application programs and store associated data in a database of the memory 128.

The platform computing system 122 further includes a token generator circuit 132. The token generator circuit 132 is structured to generate and/or otherwise create access tokens for a user 102. The access tokens are used in a token-based authentication to allow an experience provider computing system (e.g., experience provider computing system(s) 150) to access an application programming interface (API) (e.g., via the access circuit 138, as described further below) of the platform computing system 122. Furthermore, the token generator circuit 132 is structured to generate access tokens which associatively map to both an expiration (e.g., a lifespan for the access token contained in the token repository 144) and a set of user preferences and permissions (e.g., in the permissions repository 146 as further described below, with particular reference to FIGS. 2 and 3). In an exemplary embodiment, the access tokens are opaque access tokens. That is, in such an embodiment, the access tokens are proprietarily formatted by the platform computing system 122 such that they contain no inherent identifying data of a user (e.g., the user 102). Rather, such opaque tokens contain some identifier to information in a server's persistent storage (e.g., a persistent storage of the platform computing system 122, such as the token and/or permissions repository 146). The identifier may be a memory pointer, a database pointer, or any other identifier that may be modulated, or mapped to (e.g., associatively mapped via a data structure), by the platform computing system 122 in order to access data of the user 102. In other embodiments, the access token may not be opaque, and may instead be an encrypted token directly containing the data of the user 102 (e.g., such as exemplified by a JSON Web Token (JWT)).

The security circuit 134 is structured to authenticate users (e.g., the user 102) accessing the system in order to configure data sharing and permission preferences (e.g., via the interface circuit 136, as described further below). The user 102 may authenticate with the platform computing system 122 via a variety of modalities input into the client application 114 (or a web-based version of the client application 114, as described above), such as via a password, a fingerprint scan, a retinal scan, a voice sample, a face scan, and/or any other type of biometric security scan. Furthermore, the security circuit 134 is structured to verify a supplemental authentication when applicable (e.g., a two-factor authentication (2FA) presented on the user device 104 via the client application 114). The supplemental authentication may occur as part of a process to authorize an experience provider (e.g., the experience provider computing system(s) 150) to access data of the user 102 (e.g., such as discussed below, with reference to FIGS. 2 and 3). Additionally, the security circuit 134 is structured to authenticate experience provider computing system(s) 150 (e.g., subsequent to receiving an API call, via the access circuit 138, as discussed below). The security circuit 134 may authenticate the experience provider computing system(s) 150 according to credentials contained in the JSON body of the API call, such as an API token that uniquely identifies the experience provider in the token repository 144 (e.g., provisioned by the platform computing system 122 to the experience provider computing system(s) 150).

Still referring to FIG. 1, the platform computing system 122 further includes an interface circuit 136. The interface circuit 136 is structured to generate, compile, and otherwise create computer code executable on a processor of a user device (e.g., the user device 104), which when executed, creates user-interactive user interfaces (e.g., as part of a data sharing and permission settings process, as described further herein). For example, the interface circuit 136 may generate a user interface that enables a user (e.g., the user 102) to: select experience providers for data sharing (e.g., via domain, internet protocol (IP) address, or a unique hardware device ID), configure permission sets (e.g., as described further below, with reference to FIGS. 2 and 4), and configure security parameters (e.g., for a dependent account, as described further below with reference to FIGS. 2 and 3). The user interface may then be provided to the user 102 via the client application 114 (e.g., over the network 118).

The access circuit 138 is structured to initiate, receive, process, and respond to API calls (e.g., over the network 118). That is, the access circuit 138 is the access point (e.g., such as a webserver) between the platform computing system 122 and the experience provider computing system(s) 150. Accordingly, in order to process the various API calls, the access circuit 138 delegates specific tasks to the other circuits. For example, user logins are delegated to the security circuit 134 and access token creation is delegated to the token generator circuit 132. Additionally, the access circuit 138 is structured to receive communication (e.g., API calls) from the interface circuit 136, which captures inputs of the user 102. That is, the interface circuit 136 may communicate selections of the user 102 to the platform computing system 122 via the access circuit 138. Therefore, the access circuit 138 is communicatively coupled to the other circuits of the platform computing system 122, either tangibly via hardware, or indirectly via software.

The data management circuit 140 is structured to handle a wide variety of tasks associated with the gathering, analysis, configuration, categorization, and permissioning of user data. The data management circuit 140 is structured to gather data about the user 102 from any accounts associated with the platform 120, and also from experience provider computing system(s) 150, such as social media websites. The data management circuit 140 may utilize web scraping algorithms and image recognition logic to pull and aggregate data of the user 102 into the user data repository 148. Furthermore, the data management circuit 140 may then analyze and divide the user data into categories. For example, the data management circuit 140 may parse the user data (including the received updates, as further described in FIG. 2) in order to identify applicable categories. That is, the data management circuit 140 may analyze (e.g., via any suitable data analysis or natural language processing technique) various data, such as search history, browsing history, image posting, file uploads/downloads (including metadata), transaction history, and location history (e.g., of the user 102), and subsequently, associatively store them with categorical descriptors (e.g., in the user data repository 148). The data management circuit 140 is further structured to process all permissioning and settings related tasks. That is, the data management circuit 140 is structured to: verify (e.g., via the permissions repository 146) data sharing requests, apply rules to data of the user 102 (e.g., via the rules engine, as further discussed below) prior to providing the data of the user 102, provide the applicable data of the user 102 (e.g., the data of the user 102 after rules have been applied), monitor the activity of the experience provider (e.g., as discussed further herein, with reference to FIG. 6), calculate and process funds due to the user 102 (e.g., as discussed further herein, with reference to FIGS. 4, 5, and 6), and generate messages (e.g., alerts and/or notifications) for the user 102 in response to identifying non-compliant content (e.g., as discussed further in FIG. 6).

In some embodiments, the data management circuit 140 may be configured to assist experience providers with compliance of regulatory requirements such as data privacy requirements. Hence, in some embodiments, the data management circuit 140 may further be structured to implement a rules engine of the platform computing system 122. The rules engine utilizes a set of logic (e.g., rules) to modulate, or truncate, data of the user 102 that is shared with experience providers based on the data sharing and permissioning settings of the user 102 (e.g., as discussed further herein), and all applicable regulatory and privacy requirements (also referred to herein as data privacy regulatory requirements). Furthermore, the rules utilized may be configured according to inputs of the user 102 (e.g., user inputs that pertain to data sharing and/or permissioning settings). The rules utilized may be further configured (e.g., through regular maintenance and updates completed by an employee associated with the platform 120) according to any applicable data privacy regulatory requirements. That is, the rules pertaining to data privacy regulatory requirements are regularly maintained (e.g., kept up-to-date) by the platform 120. Accordingly, in response to a data sharing request from an experience provider, the rules engine may first access the permissions repository 146 and the user data repository 148 to gather data of the user 102 (e.g., as identified by the information contained in the permissions repository 146), and subsequently modulate, or truncate, the gathered data to comport with any applicable data privacy regulatory requirements (e.g., such as may be applicable for medical data, financial data, etc.). The resulting data (e.g., the applicable data) of the user 102, which is obtained after applying rules to modulate the data (e.g., as described above), may then be provided to the experience provider from which the data sharing request was received.

The data management circuit 140 is further structured to implement a payments engine of the platform computing system 122. The payments engine utilizes a payment logic of the platform computing system 122 in order to determine, verify, and process any funds due to the user 102, such as may occur as part of a shared-revenue request (e.g., as discussed herein, with reference to FIGS. 4, 5, and 6). That is, the payments engine may determine, verify, and process an amount of funds due to the user 102 according to any applicable agreements in place between an experience provider and the user 102 (e.g., advertising and/or data access related). For example, the user 102 may have an agreement in place with an experience provider that dictates that the experience provider is to share revenue with the user 102 in the amount of $0.03 for each advertisement displayed from a particular category (e.g., sports). Accordingly, in an example where the user 102 was shown ten (10) sports-related advertisements, the payments engine may calculate that the user 102 is due funds in the amount of 30 cents (e.g., 10 multiplied by the agreed-upon value of $0.03 each). In examples where the experience provider provides a tabulation of funds due, the payments engine may verify the experience provider tabulation in a similar manner (e.g., prior to processing a payment for the user 102). Furthermore, the payments engine is configured to process payments (e.g., by an API call, via the access circuit 138) for the user 102. That is, the payments engine may initiate an API call to deduct funds from an account of the experience provider and transfer funds to the user 102. In embodiments where the user 102 has a financial account with the platform 120, the payments engine may directly credit the account of the user 102 in the amount of the funds due.

The input/output circuit 142 of the platform computing system 122 is structured to exchange data, communications, instructions, etc. with an input/output component of the platform computing system 122 (e.g., a keyboard, a mouse, etc.) (e.g., with a platform 120 employee, non-employee, operator, etc.). In one embodiment, the input/output circuit 142 is incorporated into an input/output device. For example, a laptop, desktop, or tablet computer may include the input/output circuit 142 such that the laptop, desktop, or tablet computer is communicably coupled to the platform computing system 122. The input/output circuit 142 is structured to receive communications from, and provide communications to, various platform 120 employees, agents, or operators associated with the platform computing system 122.

The token repository 144 is configured to retrievably hold (e.g., in cache memory), store (e.g., in non-transitory memory), categorize, and/or otherwise serve as a repository for information pertaining to access tokens (e.g., generated access tokens as discussed further herein, with reference to FIGS. 2-6), configuration option(s) associated with the access tokens (e.g., an expiration), users (e.g., associatively mapping the access tokens to a user), and API tokens provisioned to experience providers. Accordingly, the token repository 144 is configured to retrievably store and access information pertaining to access rights of an experience provider (e.g., access to the platform computing system 122 and access to data of the user 102).

The permissions repository 146 is configured to retrievably hold (e.g., in cache memory), store (e.g., in non-transitory memory), categorize, and/or otherwise serve as a repository for information pertaining to permission settings of the user 102 (e.g., experience provider designations for data sharing, the subsets of the data to share, advertising preferences and arrangements, and any such settings associated with a dependent of the user 102).

The user data repository 148 is configured to retrievably hold (e.g., in cache memory), store (e.g., in non-transitory memory), categorize, and/or otherwise serve as a repository for information pertaining to the data of the user 102. That is, the user data repository 148 serves as the central aggregation point for all of the categorized data of the user 102, including pending alerts and notifications (e.g., as discussed further herein, with reference to FIG. 6). Accordingly, the user data repository 148 may retrievably store data of the user 102 that has been collected from, among other sources, a plurality of experience providers (e.g., as discussed further herein, with reference to FIGS. 2 and 3).

Still referring to FIG. 1, the data sharing and permissioning computing system 100 further includes an experience provider computing system(s) 150. As depicted, the experience provider computing system(s) 150 is a backend computer system. The experience provider computing system(s) 150 may be implemented using a computing system, such as a discrete server, a group of two or more computing devices/servers, a distributed computing network, a cloud computing network, and/or another type of computing system capable of accessing and communicating using local and/or global networks (e.g., the network 118). For example, in some embodiments, the experience provider computing system(s) may be a webserver.

The experience provider computing system(s) 150 includes a network interface circuit 152, a processing circuit 154, and an input/output circuit 160. The network interface circuit 152 is structured to establish communicable connections with other computing systems (e.g., the user device 104, the platform computing system 122, other computing systems, etc.), by way of the network 118. The network interface circuit 152 may include program logic that facilitates connection of the experience provider computing system(s) 150 to the network 118. For example, the network interface circuit 152 may include a combination of a wireless network transceivers (e.g., a NFC transceiver, a Bluetooth transceiver, a Wi-Fi transceiver, etc.) and/or a wired network transceiver (e.g., an Ethernet transceiver). In some arrangements, the network interface circuit 152 includes the hardware and machine-readable media sufficient to support communication over multiple channels of data communication. Further, in some arrangements, the network interface circuit 152 includes cryptography capabilities to establish a secure or relatively secure communication session in which data communicated over the session is encrypted.

The processing circuit 154 includes a memory 156 and a processor 158. The memory 156 may be one or more devices (e.g., RAM, ROM, Flash memory, hard disk storage) for storing data and/or computer code for completing and/or facilitating the various processes described herein. Memory 156 may be or include non-transient volatile memory, non-volatile memory, and non-transitory computer storage media. Memory 156 may include database components, object code components, script components, or other types of information structured for supporting the various activities and information structures described herein. The memory 156 may be coupled to the processor 158 and include computer code or instructions for executing one or more processes described herein. The processor 158 may be implemented as one or more server processors, application specific integrated circuits (ASIC), field programmable gate arrays (FPGAs), digital signal processor (DSP), microprocessors, or other suitable electronic processing components. Further, there may be a variety of different types of server(s) included in the experience provider computing system(s) 150 (e.g., application server, database server, communications server, web server, and so on). The memory device may be included with the server(s). The experience provider computing system(s) 150 is structured to run a variety of application programs and store associated data in a database of the memory 156.

The input/output circuit 160 of the experience provider computing system(s) 150 is structured to exchange data, communications, instructions, etc. with an input/output component of the experience provider computing system(s) 150 (e.g., a keyboard, a mouse, etc.) (e.g., with an experience provider employee, non-employee, operator, etc.). In one embodiment, the input/output circuit 160 is incorporated into an input/output device. For example, a laptop, desktop, or tablet computer may include the input/output circuit 160 such that the laptop, desktop, or tablet computer is communicably coupled to the experience provider computing system(s) 150. The input/output circuit 160 is structured to receive communications from, and provide communications to, various experience provider employees, agents, or operators associated with the experience provider.

Figure 2:
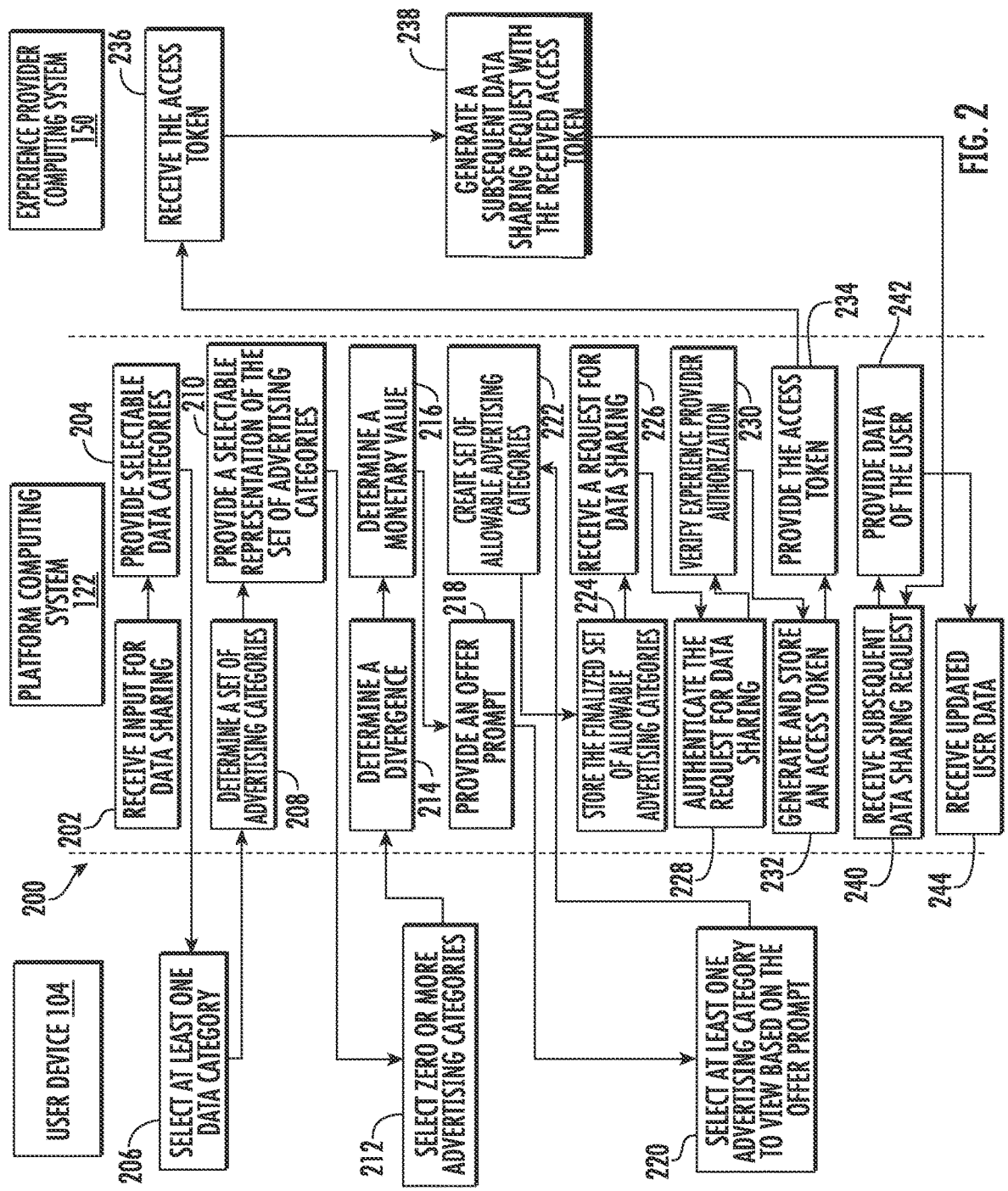
FIG. 2 is a flow diagram of a method for processing a data sharing and permissioning request from an experience provider, according to an example embodiment.

Referring now to FIG. 2, a flow diagram of a method 200 for processing a data sharing and permissioning request from an experience provider is shown, according to an example embodiment. As a broad overview, method 200 includes a description of the data sharing and permissioning configuration process, in particular as it pertains to advertising. That is, method 200 describes the advertising negotiation process in detail (e.g., between the user 102 and the experience provider computing system 150), including real-time negotiations, as it relates to the overall data sharing process. Hence, an experience provider that wishes to access certain data, or display certain advertisements, of/to the user 102 may offer to pay the user 102 a modest sum to gain access to that data (e.g., in order to improve targeted advertising), and/or to display advertisements from a particular category to the user 102. As an example, method 200 may occur as part of a user (e.g., the user 102) configuring settings for a website that they intend to visit, and then subsequently accessing the website (e.g., provided by the experience provider computing system 150). Accordingly, a practical example of the user 102 configuring settings to access a sporting goods website is discussed throughout method 200. Method 200 may be performed using the system of FIG. 1 such that reference is made to the components of FIG. 1 to aid the description of method 200.

The method 200 begins at process 202 with the platform computing system 122 receiving an input from the user 102 that identifies an experience provider for data sharing (e.g., via an API call, by the client application 114). It should be appreciated that process 202 presupposes an authenticated user-session in order to access the client application 114. Any such required authentication may be completed via the security circuit 134 prior to accessing the client application 114 (e.g., via password, biometric scan, etc., as described above with reference to FIG. 1). The input may be any variety of selections made by the user 102 via the user interface of the client application 114 (e.g., a drop-down box, a button, a highlighted row, etc.) and transmitted over the network 118. Furthermore, the user 102 may identify the experience provider according to a variety of identifiers, such as a domain name, an IP address, and unique hardware identification numbers (e.g., a MAC address). In some embodiments, the user 102 may begin to type an identifier (e.g., "goog") and an automatic predictive logic of the interface circuit 136 presents the user with auto-filled suggestions. For example, in the stated example, the interface circuit 136 may predict that the user 102 is starting to type "Google" and generate a selectable interaction point labeled accordingly (e.g., a pop-up row or button). Alternatively, the user 102 may enter an IP address, such as "8.8.8.8" (e.g., Google's public IPv4 DNS server, although it should be noted that any IP protocol version may be entered, such as IPv6). In that same vein, the automatic predictive logic of the interface circuit 136 may associate the IP address and provide a similar auto-filled suggestion. Alternatively, the user 102 may wish to share data and configure permissions for only the device identified by the IP address. In such a case, the user 102 may opt to not select the auto-filled suggestion. In some cases where the user 102 desires to share data and configure permissions for a specific device, particularly where there is concern for a pending change in the IP address, the user 102 may enter a unique hardware identification number, such as a MAC address. Furthermore, in some embodiments, the user 102 may also enter (e.g., via the client application 114) an expiration (e.g., date and time) or a predetermined number of uses (e.g., data sharing events) during this process. For example, the user 102 may have access to an IoT-enabled vehicle for a day and wish to configure data sharing for the vehicle as a one-time event. In such a scenario, the user 102 may complete the method 200 while defining the data sharing and permissioning as granting a single-use access.

Furthermore, it should be appreciated that the user 102 selection of an experience provider to share data with is a real-time updating processes and one that may occur at any point (e.g., in the methods 200, 300, 400, 500, and 600). That is, at any point during use of the systems and methods described herein, the user 102 may access the graphical user interface (e.g., via the client application 114) and disable data sharing with an experience provider (e.g., or with all experience providers, such as via a toggle generated by the interface circuit 136). For example, the user 102 may access an experience provider (e.g., a website provided by the experience provider computing system 150) and discover something alarming (e.g., the experience provider website is directed to different subject matter than originally expected by the user 102). Accordingly, the user 102 may immediately access the client application 114 and disable data sharing with the experience provider. The platform computing system 122 may then automatically expire or delete the generated access token associated with the experience provider (e.g., via an API call, or a native query, to the token repository 144), thus preventing any further sharing with the experience provider.

At process 204, the platform computing system 122 provides (e.g., via the interface circuit 136 over the network 118) selectable data categories that classify subsets of data of the user (e.g., according to a classification scheme). That is, the platform computing system 122 may first gather (e.g., as described further in FIG. 3) and aggregate all the data of the user 102 that it contains in the user data repository 148. The platform computing system 122 then classifies the user data into data category subsets according to a classification scheme. The aggregated and classified (e.g., categorized) data of the user 102 is alternatively referred to herein as a corpus (e.g., a user data corpus). The classification scheme provides a set of rules or logical expression that enable various parties (e.g., the platform 120 and the experience providers) to assign data to categories in a consistent manner. Furthermore, the classification scheme may provide rules for classification at various levels of granularity. For example, a high level classification may be political content, which may then be further broken down into further layers of sub-classifications (e.g., based on political issues, political orientation, branch of government, geographic region, and so on). In some embodiments, the classification scheme may be provided by the platform 120. In other embodiments, the classification scheme may be provided by an experience provider or a third party. Accordingly, the classification scheme utilized may be agreed upon by the platform 120 and an experience provider prior to use (e.g., such as during an initial contract negotiation). In other embodiments, the classification scheme may be subject to change (e.g., dynamically with regulation changes, user preference changes, etc.) and decided on a per-use basis (e.g., via an API call).

Therefore, as an example, the platform computing system 122 may create data subsets (e.g., according to the classification scheme) representing social activities, political affiliations, financial information, education information, and culinary preferences. It should be appreciated that the data categories are not limited by the examples provided herein, but rather, are subject to dynamic change at the discretion of the platform 120. In some embodiments, the platform computing system 122 may generate data categories in response to current events. For example, during a weather emergency, the platform computing system 122 may generate and provide a category representing the weather emergency (e.g., a hurricane category). Moreover, in some embodiments, the platform computing system 122 may periodically communicate (e.g., an API call via the access circuit 138) with an experience provider computing system 150 for current events and updates (in order to generate and provide up-to-date categories at all times). Furthermore, in yet another embodiment, the user 102 may create categories of their own and subsequently assign data to them (e.g., via the client application 114). As an example, the platform computing system 122 may categorize a subset of data as pertaining to sports or hobbies; however, the user 102 may wish to further narrow such a subset and re-classify the data into a golf and a football category. In such a scenario, the user 102 may either manually assign data (e.g., via the client application 114) into the new categories or rely on the predictive logic of the interface circuit 136 to assign data into the respective categories (e.g., all data pertaining to golf or originating from a golf-oriented experience provider may be predictively assigned). Accordingly, the classification scheme employed by the various parties to assign data to such categories may be updated in response to any data category changes (e.g., where applicable). Additionally, in some embodiments, the platform computing system 122 may create data categories that represent data subsets that have been grouped based on the origin of the data contained therein (e.g., a data category representing all data of the user 102 contained by experience provider X). Accordingly, in such embodiments, the user 102 may select such a data category to create a data sharing relationship between the experience provider identified in process 202 and the experience provider represented by the selected data category (e.g., experience provider X). That is, in such an embodiment, the user 102 may grant an experience provider access to all applicable data of the user 102 contained by one or more other experience providers (e.g., instead of, or in addition to, designating topical categories to share).

At process 206, the user 102 selects (e.g., via a selectable icon such as a checkbox, presented via the client application 114) at least one data category from the provided data categories for sharing with the identified experience provider. That is, the user 102 makes a decision to share all the data contained in the selected categories with the identified experience provider. For example, the user 102 may decide to share all data categorized as football, hobbies, etc. with an experience provider (e.g., the sporting goods website). Additionally, in an exemplary embodiment, the user 102 may be presented with a checkbox or other selectable icon (e.g., via the client application 114) that allows the user 102 to select all the potential categories with a single input. The client application 114 then transmits the selections of the user 102 to the platform computing system 122 (e.g., via an API call over the network 118). Accordingly, at the conclusion of process 206, the user 102 has identified an experience provider (e.g., a sporting goods website) and at least one data category from which the user 102 desires to share data with the experience provider (e.g., data represented by the data category to share with the website, such as hobbies and favorite sports of the user 102).

At process 208, the platform computing system 122 receives the selection of data categories from the user 102 and subsequently determines a set of advertising categories (e.g., according to the classification scheme) applicable to the identified experience provider. The applicable advertising categories correlate to advertising topics that are displayed by the experience provider (e.g., an experience provider domain, for example, as provided by the experience provider computing system 150). The platform computing system 122 may determine the set of applicable advertising categories via a variety of modalities. In one embodiment, the platform computing system 122 may receive periodic (e.g., daily, weekly, monthly, etc.) updates from cooperating experience providers that identify the advertising categories currently utilized. In an exemplary embodiment, the platform computing system 122 may communicate in real-time with an experience provider computing system 150 associated with the identified experience provider. In such an embodiment, the platform computing system 122 may formulate a GET request, for example, and transmit it over the network 118, via the access circuit 138 (e.g., communicating via application programming interfaces (APIs)). The GET request being structured to get a real-time list of the applicable advertising categories of the identified experience provider. In response, the platform computing system 122 receives a real-time list of the applicable experience provider advertising categories (e.g., formatted in JavaScript Object Notation (JSON)). The platform computing system 122 may then parse the JSON response and derive a text-based list of the applicable advertising categories (e.g., based on the rules defined in the classification scheme). Continuing the example of the user 102 accessing a sporting goods website, the platform computing system 122 may determine that the website serves advertisements relating to sports, travel, and finances.

At process 210, the platform computing system 122 generates a selectable representation of the applicable advertising categories received at process 208. The selectable representation may be in the form of a list with checkboxes, buttons, or via an otherwise selectable graphic. The platform computing system 122 then transmits the generated selectable representation over the network 118 (e.g., via the interface circuit 136, displayed on the client application 114).

The client application 114 receives the generated selectable representation and displays it for the user 102 (e.g., via a display device of the user device 104). At process 212, the user 102 selects (e.g., via the client application 114) zero or more advertising categories that the user 102 is willing to view. For example, continuing the sporting goods website discussion, the client application 114 may display selectable representations of sports, travel, and finances. The user 102 may decide that they are interested in sports, but not travel or finances. As another example, the experience provider may display advertisements that are categorized as political, footwear, and rental properties. The user 102 may then decide that they are interested in new shoes and a new apartment, but that they have no interest in viewing political campaign advertisements. Accordingly, the user 102 selects footwear and rental properties (or just sports in the sporting goods website example), but leaves the political (or travel and finances in the sporting goods website example) selectable icon un-selected (e.g., an un-checked checkbox). The client application 114 then transmits these selections to the platform computing system 122 (e.g., via an API call over the network 118).

The platform computing system 122 then receives the transmitted advertising category selections. At process 214, the platform computing system 122 determines (e.g., via the data management circuit 140) a divergence, or difference, between the set of advertising categories displayed by the identified experience provider and the user 102 selection of zero or more advertising categories that they are agreeable to viewing. The platform computing system 122 may determine such a divergence via any variety of algorithms or computational processes. For example, the platform computing system 122 may remove the intersection of the two sets and then parse any remaining advertising categories of the experience provider into a list or a new divergent set (e.g., creates a list or set). That is, in the sporting goods website example, the platform computing system 122 creates a divergent set containing categories of travel and finances (e.g., the un-selected options).

At process 216, the platform computing system 122 determines (e.g., via the data management circuit 140) a monetary value for each of the advertising categories displayed by the experience provider contained in the divergent set or list. For example, continuing the previous example, the divergent set contains only one entry correlating to political advertisements. The platform computing system 122 may then determine the monetary value for each political advertisement served on the experience provider computing systems 150 of the identified experience provider. In some embodiments, the platform computing system 122 may receive periodic updates from cooperating experience providers (e.g., similar to, or apart of, the periodic updates of process 208), which associate a monetary value to the advertising categories. In an exemplary embodiment, the platform computing system 122 may formulate a GET request, for example, and transmit it over the network 118, via the access circuit 138. The GET request being structured to get a real-time list of the monetary values associated with each applicable advertising category of the identified experience provider. In response, the platform computing system 122 receives a real-time list, or dictionary, of the monetary values associated with the applicable experience provider advertising categories (e.g., formatted in JavaScript Object Notation (JSON)) contained in the divergent set. The platform computing system 122 may then parse the JSON response and derive, for example, an associative dictionary containing advertising categories and their associated monetary values. As an example result, the platform computing system 122 may then determine that political advertisements have a monetary value of 5 cents per view (to the experience provider). In some embodiments, the JSON response may also contain a minimum monetary value that the experience provider is willing to accept for displaying advertisements from each advertising category. That is, the identified experience provider may dictate that it needs at least 3 cents per view from advertisements in the political category. Therefore, the identified experience provider enables the platform computing system 122 to negotiate with the user 102 on their behalf (e.g., by leaving 2 cents of disposable revenue from such advertisements).

Accordingly, at process 218, the platform computing system 122 generates (e.g., via the interface circuit 136) and provides (e.g., via the client application 114 and over the network 118) a prompt that offers the user 102 a portion of the determined monetary value for each advertising category displayed by the experience provider and contained in the divergent set. For example, continuing the previous example, the platform computing system 122 may offer the user 102 1.5 cents per political advertisement viewed (e.g., maintaining 0.5 cents as compensation for facilitating the process). In other embodiments, the platform computing system 122 may offer the entire example budget of 2 cents directly to the user 102 and derive compensation in another fashion, or not at all. In yet another embodiment, the platform computing system 122 may facilitate a real-time negotiation between the identified experience provider and the user 102 (e.g., via a collaborative effort between the data management circuit 140, the access circuit 138, the client application 114, and the experience provider computing system 150). In such an embodiment, the platform computing system 122 may query the experience provider computing system 150 with an API call identifying the un-selected advertising categories to the experience provider computing system 150. In response, the experience provider computing system 150 may provide an initial monetary offer in order to view advertisements from each un-selected advertisement category. Continuing the example, the experience provider computing system 150 may respond with an offer of 0.5 cents per view of political advertisements. Subsequently, the platform computing system 122 may then present that offer to the user 102 (e.g., via the client application 114). The user 102 may then decide to accept the offer, decline the offer, or make a counter offer (e.g., make a counter offer of 1.5 cents). Accordingly, the platform computing system 122 may communicate these offers back and forth between the parties (e.g., via API calls) until an agreement is reached or until either party declines.

Therefore, at process 220, in all embodiments, the selections of the user 102 indicating an amenability (e.g., an agreement) to view advertisements from previously un-selected categories are captured by the client application 114 and transmitted back to the platform computing system 122 (e.g., via an API call over the network 118). In some embodiments, the user 102 may decide not to change their advertisement viewing preference and select zero of the advertising categories from the offer prompt.

At process 222, the platform computing system 122 receives the selections of the user 102 and creates a finalized set of allowable advertising categories for the identified experience provider. Furthermore, the finalized set of allowable advertising categories is then processed by the platform computing system 122 in order to generate a linked data structure (e.g., a tuple list, a dictionary, a hash-based map, etc.). The linked data structure is structured to associatively map the allowable advertising categories to the agreed upon monetary compensation for the user 102, when applicable.

At process 224, the identified experience provider, the user 102 selection of at least one data category, and the linked data structure of the finalized set of allowable advertising categories are retrievably stored in the permissions repository 146 of the platform 120. In some embodiments, the platform computing system 122 may first convert the linked data structure of the finalized set of allowable advertising categories into a table (e.g., rows and columns) prior to retrievably storing it in the permissions repository 146. The aforementioned items may be stored, for example, via an API call or a native query (e.g., MySQL query, PostgreSQL query, etc.). In some embodiments, the linked data structure may be simultaneously maintained in a memory 128 of the platform computing system 122 and also converted into a table (e.g., rows and columns) for storing in a repository (e.g., the permissions repository 146).

Furthermore, in some embodiments, the processes 202-224 may also be completed for a dependent(s) of the user 102. That is, the user 102 may indicate (e.g., via the client application 114) a desire to establish data sharing and permissioning preferences for a dependent(s) (e.g., a child). In such embodiments, the user 102 may complete the processes 202-224 as described for an alternative account (e.g., "userChild.i") and link it (e.g., via the client application 114) to their own account (e.g., linked as a dependent account, maintaining administrative privileges). Therefore, it should be appreciated that any of the methods described herein as pertaining to a user (e.g., the user 102) may be completed on behalf of a dependent and associatively stored with the account of the user 102 (e.g., as a dependent account, thus maintained administrative privileges for the user 102).

At process 226, the platform computing system 122 receives a request for data sharing (e.g., alternatively referred to as a request for access to data of the user 102) from an experience provider (e.g., over the network 118). The request may be communicated as an API call received and processed by the access circuit 138 of the platform computing system 122. Furthermore, in an exemplary embodiment, the request is received in response to the user 102 interacting with a secure pop-up on an interactive asset of the experience provider (e.g., an encrypted pop-up that serves as a connection to the platform computing system 122 while on the interactive asset of the experience provider). In other embodiments, the request is received in response to the user 102 logging into an interactive asset of the experience provider with a digital identity proxy (e.g., "user.i"). In the exemplary embodiment, the request may be structured to contain an identifier of the experience provider and an API route (e.g., for passing an access token in the response, as further discussed below). In other embodiments, the request may be structured to contain an identifier of the experience provider and the gathered credentials of the user (e.g., as input into the experience provider computing system 150 during the login with the digital identity proxy). Both embodiments are discussed in further detail below and in the description of FIG. 3. That is, continuing the sporting goods website example, process 226 may occur as a result of the user 102 logging into the website (e.g., as described above, and further in FIG. 3). Accordingly, in response to the login of the user 102, the sporting goods website initiates a data sharing request in order to customize the experience of the user 102 (e.g., via analysis of the data of the user 102 and a subsequent modification of the content served).

At process 228, the platform computing system 122 authenticates the request for data sharing from the experience provider (e.g., the request for access to data of the user 102), via the security circuit 134. In the exemplary embodiment, the platform computing system 122 receives the credentials of the user 102 directly, via an encrypted connection (e.g., a Secure Sockets Layer (SSL) pop-up) that is initiated by a user interaction on an experience provider asset (e.g., a button, a hyper-link, etc.). In other embodiments, the platform computing system 122 may receive the credentials of the user 102 indirectly, such as via an API call from the experience provider computing system 150. In such embodiments, the user 102 may have logged in directly to an experience provider computing system 150 with the digital identity proxy (e.g., "user.i"). In response, the experience provider computing system 150 recognizes the digital identity proxy (e.g., according to the format of the credential, such as "user.i") as indicating that the user 102 wishes to utilize the data sharing and permissioning protocols described herein, and accordingly, passes the credentials of the user 102 to the platform computing system 122 in order to authenticate (e.g., over an SSL connection). In yet other embodiments, the platform computing system 122 may require a second, additional authentication (e.g., in addition to the credentials of the user 102). In such embodiments, the platform computing system 122 may transmit (e.g., via the security circuit 134, over the network 118) a 2FA prompt. The 2FA prompt may be structured as a push notification (e.g., via the client application 114), an SMS, an email, etc. Additionally, the 2FA prompt may also require a fingerprint scan, a retinal scan, or some other biometric to ensure that the user credentials were indeed entered by the user 102. The security circuit 134 verifies that the received credentials of the user 102 are correct (e.g., by comparing the received credentials with those stored in the permissions repository 146).

At process 230, the platform computing system 122 verifies, via the data management circuit 140, that the experience provider associated with the experience provider computing system 150 is designated for data sharing by the user 102 in the permissions repository 146 (or that the experience provider computing system 150 is designated directly in the permissions repository 146, via IP address, or a hardware identifier). For example, the platform computing system 122 may receive a data sharing request from a specific experience provider (e.g., the sporting goods website), and subsequently query the permissions repository 146 (e.g., via an API call, or directly, via a native query in MySQL, PostgreSQL, etc.) In such an example, the query is made in order to verify that the user 102, identified by the received credentials of process 228, has designated the specific experience provider (e.g., the sporting goods website) as an intended data sharing recipient.

At process 232, the platform computing system 122 generates an access token for the experience provider to utilize in subsequent data sharing requests, and stores the generated access token in the token repository 144 (e.g., via an API call, or directly, via a native query in MySQL, PostgreSQL, etc.). That is, continuing the example, the platform computing system 122 generates an access token that the experience provider (e.g., the sporting goods website) may use to access data of the user 102. In an exemplary embodiment, the access token is generated as an opaque access token (as described above, with reference to FIG. 1). That is, in such an embodiment, the access token is formatted by the platform computing system 122 such that it contains no inherent identifying data of a user (e.g., the user 102). Rather, such opaque tokens contain some identifier of the user 102 data in the token repository 144 (as configured in processes 204-224), such as a pointer or value that only has meaning in the context of the token repository 144. In this way, security for the process is enhanced. Additionally, if the user 102 has not entered an expiration or a predetermined number of uses during process 202, the platform computing system 122 may assign a predetermined expiration date (e.g., an amount of time applied as the default to all such access tokens at the time of generation). In other embodiments, the access token may be an encrypted token (e.g., a JWT token, or other encrypted format) that contains the data (as configured in processes 204-224) directly. In embodiments that utilize such encrypted tokens, processes 234-242 may be ignored, as they pertain to accessing the data with the opaque token of the exemplary embodiment. For example, the encrypted token embodiments may utilize an asymmetric public-private key cryptosystem, such as RSA. Therefore, the experience provider computing system 150 may decrypt the access token at its discretion, according to the cryptosystem in place, in order to access the data of the user 102.

At process 234, the platform computing system 122 provides (e.g., via an API response, over the network 118) the access token to the experience provider computing system 150. At process 236 and 238, the experience provider computing system 150 receives the access token and generates a subsequent data sharing request (e.g., now containing the access token received at process 236).

At process 240, the subsequent data sharing request (e.g., alternatively referred to as a request for data of the user 102) containing the access token is received by the access circuit 138 (e.g., via an API call). That is, in the sporting goods website example, process 240 represents the website making an authorized (e.g., containing the access token) request to access data of the user 102. Accordingly, at process 242, the platform computing system 122 (e.g., the rules engine of the data management circuit 140) provides the data of the user 102 as identified by the access token (e.g., as associatively mapped to in the permissions repository 146). It will be appreciated that in some embodiments, the platform computing system 122 may not store the aggregated data of the user 102 (e.g., in order to provide to an experience provider in response to a data access request). Rather, in some embodiments, the platform computing system 122 may instead make an API call(s) to all eligible experience providers participating in the service of the platform 120, which requests the applicable data contained locally by each experience provider. Accordingly, in such embodiments, the platform computing system 122 may then aggregate the data of the user 102 on the fly (e.g., as the API call(s) return with responses), process it via the rules engine (e.g., of the data management circuit 140, as discussed further herein), and ultimately provide the applicable data (e.g., the data after rules have been applied) of the user 102 without storing it or only temporarily storing it. In addition to providing any data selected by the user 102 (e.g., as identified in process 206), the platform computing system 122 also includes the information identifying the advertising categories of the user that can only be displayed in exchange for currency (e.g., as discussed in processes 208-224), and their associated currency value (e.g., 2 cents per view, as per the continued example). In some embodiments, the platform computing system 122 may generate and transmit an internal confirmation message (e.g., from one API to another) that confirms the data of the user 102 was provided to the experience provider.

At process 244, the platform computing system 122 receives (e.g., via an API call) an update to the data of the user 102 based on the activity of the user 102 during their interactions with the experience provider computing system 150 (e.g., henceforth discussed as activity data). For example, continuing the sporting goods website discussion, the platform computing system 122 may receive updates (e.g., from the website) that identify activities of the user 102 on the website, which occurred after the data sharing (e.g., transactions, navigations, selections, etc.). In addition to the activity data, the platform computing system 122 may also receive a tabulation (e.g., a systematic count, record, or list) of any funds due according to the advertising categories that were monetized for the user 102 during processes 208-224. Accordingly, the platform computing system 122 may then verify any received tabulation of funds due and initiate a payment for the user 102 in the amount due (e.g., via the payments engine of the data management circuit 140). In some embodiments, the activity data is received directly from the experience provider computing system 150 as part of a financial arrangement, a contract (e.g., between the platform 120 and the experience provider), or as part of a cooperative regulatory arrangement. In other embodiments, the client application 114 may monitor (e.g., with consent from the user 102) activities of the user directly (e.g., when the experience provider computing systems 150 are accessed by the user 102 via the user device 104). In yet other embodiments, the platform computing system 122 may provide the user 102 with a browser extension or plugin that monitors (e.g., with consent from the user 102) the activity of the user. In all embodiments, subsequent to receiving the activity data, the platform computing system 122 updates (e.g., via an API call, or directly, via a native query in MySQL, PostgreSQL, etc.) the user data held in the user data repository 148.

Furthermore, while the method 200 describes revenue sharing between the experience provider and the user 102 as it pertains to advertising, it will be appreciated that in some embodiments the user 102 may receive a shared-revenue offer simply for authorizing access to data. That is, the user 102 may receive an offer (e.g., $1, $3, etc.) from the experience provider to access data of the user 102. Such an offer may be in addition to, or separate from, any advertising agreements made. Accordingly, funds due for revenue sharing regarding access to data (e.g., of the user 102) are included in the received tabulation.

In some embodiments, a plurality of APIs can be used to carry out the processes of method 200. For example, a first API can be configured to facilitate communication of data between the user 102 and the platform computing system 122 (e.g., processes 202-206, 210-212, 218-220, 226-228, and 244), and a second API can be configured to facilitate communication of data between the platform computing system 122 and the experience provider computing system(s) 150 (e.g., processes 204, 208, 216-218, 226-228, 234, and 240-244). However, it will be appreciated that any number of APIs could be used to carry out the processes of method 200. For example, more than one API could be configured to facilitate communication of data between the user 102 and the platform computing system 122 (e.g., processes 202-206, 210-212, 218-220, 226-228, and 244), and likewise more than one API could be substituted for the second API discussed above. Furthermore, it will be appreciated that, for the experience providers, the APIs may be provided based on template APIs developed by the platform 120 and reused by the experience provider, or may be custom-written according to an API documentation (e.g., provided by the platform 120, such that the experience provider may conveniently access the endpoint functions of the data sharing and permissioning service).

Figure 3:
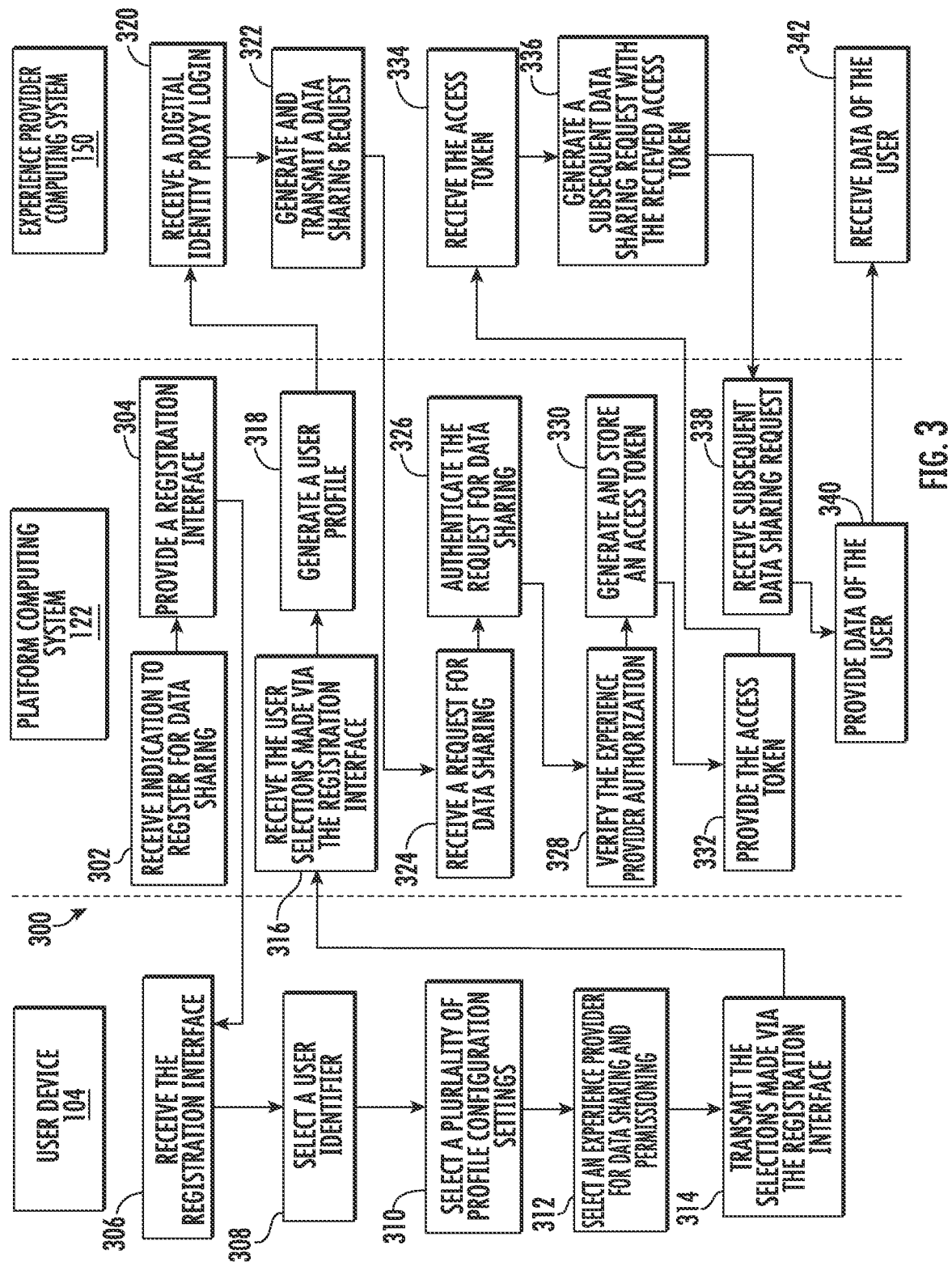
FIG. 3 is a flow diagram of a method for processing a data sharing and permissioning request from an experience provider, according to another example embodiment.

Referring now to FIG. 3, a flow diagram of a method 300 for processing a data sharing and permissioning request from an experience provider is shown, according to an example embodiment. As a broad overview, method 300 includes a description of a registration process for the data sharing and permissioning protocol of the platform 120, and the subsequent processing of a data sharing request. That is, method 300 discusses a user 102 signing up for the data sharing service of the platform 120, including the establishment of a digital identity proxy. Thus, when the user 102 visits an experience provider website, the user 102 uses their ".i" digital identity proxy and, on this basis, the experience provider recognizes the user as being someone that utilizes the services of the platform 120. With this in mind, the experience provider recognizes that it may send API calls to the platform computing system 122 in order to gain additional information about the user 102 in real time (i.e., while the user is enjoying the features/functionality of the experience provider web site, as opposed to in an offline manner). Method 300 further describes user profiles that implement templates of the platform 120 in order to establish initial settings for a new user. As an example, method 300 may occur as part of a user (e.g., the user 102) registering for the data sharing service of the platform 120, configuring settings for a web site that they intend to visit, and then subsequently accessing the website (e.g., provided by the experience provider computing system 150). Accordingly, a practical example of the user 102 registering for the data sharing service, configuring settings, and subsequently accessing a social media website is discussed throughout method 300. Method 300 may be performed using the system of FIG. 1, and with similar implementation as the processes of method 200, such that reference is made to the components of FIG. 1 and FIG. 2 in order to aid the description of method 300.

The method 300 begins at process 302 with the platform computing system 122 receiving an indication (e.g., via the interface circuit 136, and provided as an API call of the client application 114) from a user 102 to register for a data sharing and permissioning account. It should be appreciated that process 302 presupposes (e.g., similar to process 202) an authenticated user-session in order to access the client application 114. Any such required authentication may be completed via the security circuit 134 prior to accessing the client application 114 (e.g., via password, biometric scan, etc., as described above with reference to FIG. 1). The indication may be any variety of selections made by the user 102 via the user interface of the client application 114 (e.g., a drop-down box, a button, a voice command, etc.), and subsequently transmitted over the network 118.

At process 304, the platform computing system 122 provides the user 102 with a registration interface (e.g., generated by the interface circuit 136 and provided as an API call over the network 118). The registration interface is structured to prompt the user 102 for registration information and account preferences. Accordingly, the registration interface provides the user 102 with a variety of selectable interaction points (e.g., drop-down box, text-entry area, buttons, checkboxes, etc.) to easily facilitate the gathering of the required user information and account preferences (e.g., as further discussed below, and illustrated in FIG. 10).

At process 306, the user device 104 receives the registration interface and displays it to the user 102 (e.g., via the client application 114, and over the network 118). At process 308, the registration interface first prompts the user 102 to establish a user identifier (e.g., formatted as a digital identity proxy, such as "user.i") and a user password. The digital identity proxy is an identifiable (e.g., identifiable to the experience provider computing system(s) 150) sequence of characters (e.g., a string token) that identifies a username as participating in the data sharing and permissioning protocol of the platform 120. In an exemplary embodiment, the digital identity proxy is a string of characters that ends in ".i". For example, a user (e.g., the user 102) named Tom may establish a user identifier that incorporates the name Tom, such as "tom.i" or "tomr.i". In other examples, the user 102 may establish a user identifier that correlates to a passion, such as "baseballfanatic.i". It should be appreciated that any variety of characters may be combined to create a string formatted as a digital identity proxy, as long as the user identifier complies with any predetermined rules (e.g., as implemented by the platform 120) and is unique in the system (e.g., only one user may have the user identifier "tom.i"). That is, in alternative embodiments, the digital identity proxy may utilize a different sequence of characters (or string token). For example, in alternative embodiments, the user identifier may be "tom:i", "i.tom", or "tom*". It should be appreciated that any sequence of characters may act as the string token, as long as it is consistent across the platform (e.g., the platform computing system 122) and all the users (e.g., the user 102).

Continuing the example of the exemplary embodiment, the platform computing system 122 may first query the permissions repository 146, via an API call or a native query (e.g., MySQL query, PostgreSQL query, etc.), and verify that no other accounts are already registered with the user identifier "tom.i". In response to successfully verifying that the user identifier is available (e.g., unclaimed), the user 102 may continue by entering a password (e.g., for the "tom.i" account) and the remainder of the required user information. The remainder of the required user information may include a variety of record-keeping items, such as: a full legal name, a current address, a telephone number, an email address, a financial account information, etc.

At process 310, the registration interface prompts (e.g., via the client application 114) the user 102 to select and configure a variety of account profile options (also referred to as the profile configuration settings). The profile configuration settings include options that pertain to security and profile population (e.g., for the user 102). The security-based settings may include confirming the items entered during process 308, such as the telephone number (e.g., via a 2FA prompt), the email address (e.g., via an email containing a hyperlink or a code that must be entered into the client application 114), and the financial account. The financial account may be confirmed via, for example, an undisclosed value, marginal deposit or withdrawal (e.g., 1 cent, 3 cents, etc.), made by the platform 120 to the user-entered financial account. The user 102 may then verify the financial account by entering the value of the marginal deposit or withdrawal into the client application 114.

In some embodiments, the platform 120 may be, or may be associated with, a financial institution. Accordingly, in such embodiments, the registration interface prompts may include a selectable list (e.g., a drop-down menu) of any financial accounts held by the user 102 with the platform 120. In other words, the platform computing system 122 may first determine if the user 102 holds any financial accounts with the platform 120 (e.g., by querying the user data repository 148 or an accounts database (not depicted)), and subsequently, provide (e.g., via the interface circuit 136) the user 102 with a selectable list containing any determined accounts of the user 102. Therefore, the user 102 may select a financial account from the prepopulated list rather than entering the financial account manually (e.g., typing in the account numbers). Furthermore, the verification of the financial account (e.g., as discussed above) may still be required by the financial institution (e.g., platform 120) in order to increase security (e.g., prove ownership, or authorized access, to the prepopulated account).

The profile configuration settings pertain to populating the user profile (e.g., for data sharing) of the user 102 and to configure alerts (e.g., discussed further below). In some embodiments, the user 102 may select (e.g., via the user interface displayed on the client application 114) to gather initial data from experience providers (e.g., social media accounts, financial accounts, shopping accounts, etc.). In such an embodiment, the user 102 may enter the credentials for each experience provider that they would like to centralize the data from (e.g., in the user data repository 148). For example, the user 102 may make a selection identifying a particular social media website, enter credentials (e.g., existing credentials of the user 102 at the particular social media website), and subsequently, the platform computing system 122 may scrape the particular social media website (e.g., via a web-scraping technique implemented by the data management circuit 140). In other embodiments, the platform computing system 122 may transmit an API request for the corpus (e.g., a data set(s)) data of the user 102 (e.g., a current corpus of data relating to the user 102 held by the experience provider) to the identified experience provider (e.g., via the access circuit 138). In some embodiments, the request for the corpus of the user 102 may contain authorization information, such as the credentials of the user 102 or a token identifying the platform computing system 122 to the experience provider (e.g., in order to verify the API call). Furthermore, in some embodiments, the platform computing system 122 may poll the experience provider members of the data sharing and permissioning service (e.g., via API calls) to retrieve all the initial corpus data relating to the user 102 at once (e.g., in addition to any specific designations, data submissions, questionnaires, etc., as described herein for data aggregation purposes). Accordingly, the platform computing system 122 may then receive an API response(s) from the experience provider(s) containing the corpus data of the user 102 (e.g., the aggregated and categorized data of the user 102, as contained by the experience provider(s) computing system(s) 150). The data garnered (e.g., via scraping, API call, etc.) may then be categorized according to the classification scheme (e.g., via the data management circuit 140) and retrievably stored in the user data repository 148 (e.g., via an API call or a native query). In other examples, the user 102 may not identify an experience provider for data scraping. In such examples, the user profile may be built based on any accounts of the user 102 held by the platform 120 (e.g., bank accounts, lending data, etc.), when applicable. Furthermore, in such examples, the user 102 may respond to a questionnaire (e.g., generated by the data management circuit 140, and provided by the interface circuit 136), which enables the platform computing system 122 to create a user profile for the user 102 according to common data points of interest. For example, the questionnaire may ask the user 102 questions regarding: political affiliation, religious affiliation, employment status, education level, hobbies, opinions around current events, etc. It should be noted that the preceding is not an exhaustive list. The questions provided via the questionnaire may be based on any data category and furthermore determined to be a common point of interest at the discretion of the platform 120 (e.g., based on feedback from experience providers, advertising desires, etc.).

Still referring to the profile configuration settings, the platform computing system 122 may analyze (e.g., via the data management circuit 140) the user 102 responses to the questionnaire, any data scraped from experience providers, and any data from accounts held by the user 102 and associated with the platform 120. Subsequently, the platform computing system 122 may predict (e.g., via the data management circuit 140) a data sharing and permissioning template to apply to the user profile of the user 102. For example, the platform computing system 122 may predict (e.g., based on the gathered information) that the user 102 is an avid user of social media and a frequent attendee of concerts. Accordingly, in such an example, the platform computing system 122 may prompt the user (e.g., via the client application 114) to confirm template settings that automatically share data with a variety of social media websites and any website pertaining to music or concert functions (e.g., scheduling, news, ticket vendors, etc.). In some examples, the user 102 may decide that the predicted template is too broad, or otherwise not the preferred default settings for the user 102. In such an example, the user 102 may decide to select aspects of the template to adjust (e.g., perhaps the user 102 is happy to share data with the variety of social media sites, but not ticketing venues). Accordingly, the user 102 may alter (e.g., via the client application 114) the aspects of the template that are undesired. Alternatively, the user 102 may decide to apply data sharing and permissioning settings manually for each experience provider. In such an example, the platform computing system 122 may disable all data sharing by default.

Furthermore, the profile configuration settings include options for the user 102 to configure alerts and notifications. The alerts and notifications may occur as part of security and login procedures (e.g., a 2FA prompt confirming a data sharing request) and as part of advertising offers (e.g., as explained in FIG. 2, and further discussed in FIG. 6). That is, the user 102 may configure modalities of delivery (e.g., email, SMS, 2FA prompt, etc.) and triggers (e.g., security, advertising, etc., as discussed in FIG. 6) for alerts and notifications via the client application 114.

At process 312, the user 102 selects an experience provider for data sharing and permissioning. It should be noted that process 312 may not always occur during the initial registration process as described in processes 302-310 (e.g., it could happen at a later time, or not at all). The process of 312 may occur at the discretion of the user 102 (e.g., in addition to any template selections made in process 310). Accordingly, should the user 102 decide to manually adjust the experience provider data sharing and permissioning settings during the initial registration, the process 312 may occur substantially similar to the processes 202-224 of the method 200, as described in FIG. 2. At process 314, the selections of the user 102 made via the registration interface (e.g., displayed via the client application 114) are transmitted to the platform computing system 122, over the network 118. That is, at the conclusion of process 314, the user 102 has successfully completed registration inputs for the data sharing service of the platform 120. Although other processes remain, such as generating a user profile (e.g., as discussed below), the necessary information of the user 102 has been gathered and relayed (e.g., back to the platform computing system 122) at the conclusion of process 314.

At process 316, the platform computing system 122 receives the selections of the user 102 made via the registration interface. At process 318, the platform computing system 122 (e.g., via the data management circuit 140) generates a user profile for the user 102 based on the received selections. The user profile contains the account preferences of the user 102, the data sharing and permissioning settings of the user 102, and the data of the user 102. The aforementioned aspects of the user profile may be associatively linked and retrievably stored in both the permissions repository 146 (e.g., the account preferences and the data sharing and permissioning settings) and the user data repository 148 (e.g., the data of the user 102). Therefore, by associatively linking the various components of the user profile, the user 102 may dynamically configure (e.g., via the client application 114) any of the settings at any time, according to the relevant processes for the component (e.g., as described herein, with reference to FIGS. 2, 3, and 4). That is, for example, the user 102 may open the client application 114 at any point and adjust data sharing and permissioning settings to match a template (e.g., rather than having manually adjusted settings), as described in process 310.

At process 320, an experience provider computing system 150 receives a digital identity proxy login, thus identifying a current session as a data sharing and permissioning user (e.g., of the user 102). For example, the experience provider computing system 150 may receive a digital identity proxy login through a text-entry login component (e.g., the user 102 enters "tom.i" into a username field of a login screen of the experience provider). In exemplary embodiments, the user 102 simply needs to enter the username (e.g., "tom.i") in order to be identified by the experience provider computing system 150 (e.g., identified as utilizing the data sharing and permissioning protocol associated with the platform 120). That is, the user 102 need not enter a password directly into any component associated with the experience provider computing system 150. Additionally, the experience provider may display a selectable interaction point (e.g., a button or a link labelled "Login with your *.i identifier here", etc.) that launches a login window of the platform computing system 122. For example, in some embodiments, the selectable interaction point may be structured to execute a block of code that is structured (e.g., JavaScript) to create a secure pop-up (e.g., an SSL encrypted connection to the platform computing system 122) that appears on the experience provider component (e.g., the website being served via the experience provider computing system 150). Further, it will be appreciated that these interactions occur (e.g., as described above) as a substitution to a typical experience provider login processes. That is, the interactions described above occur rather than the experience provider receiving a username and a password (e.g., via a login component of the experience provider), and subsequently verifying the credentials against an internal experience provider database (e.g., an accounts database of the experience provider). Accordingly, continuing the example of the user 102 accessing a social media website, process 320 may occur responsive to the user 102 logging into the social media website with a digital identity proxy login, or alternatively, to the user 102 interacting with the selectable interaction point.

Therefore, and now referring to process 322, the block of code may be structured to generate an API call (e.g., a data sharing request) to the platform computing system 122. In some embodiments, the API call may contain a uniform resource locator (URL), thus creating the SSL encrypted window directly to an address to the platform computing system 122, as well as an identifier of the experience provider (e.g., in a JSON body of the call). For example, the platform computing system 122 may provision API tokens (e.g., an access token that the access circuit 138 requires to validate a call) to the experience provider. Therefore, the experience provider computing system 150 may validate API calls by including the provisioned API token. In other embodiments, the experience provider computing system 150 may validate its calls by including an identifier string and a password. Furthermore, it should be noted that subsequent to receiving a digital identity proxy login through a text-entry component, the experience provider computing system 150 may initiate the rest of the process as though the selectable interaction point was selected instead (e.g., in order to protect the user 102 from entering the data sharing and permissioning password into an experience provider computing system 150). Accordingly, security for the process is improved by isolating the exposure of password entry to only the platform computing system 122.

At process 324 and 326, the platform computing system 122 receives (e.g., via the access circuit 138) the data sharing request (e.g., the API call containing the identifier of the experience provider) and authenticates it (e.g., via the security circuit 134). Similar to method 200, the data sharing request may be alternatively referred to as a request for access to data of the user 102. That is, continuing the social media website example, process 324-326 may occur as a result of the user 102 logging into the website (e.g., as described above). Accordingly, in response to the login of the user 102, the social media website initiates a data sharing request in order to customize the experience of the user 102 (e.g., via analysis of the data of the user 102 and a subsequent modification of the content served). The authentication process may be two-fold, such that it requires authenticating the call itself and the user credentials (e.g., entered into the SSL pop-up and received only by the platform computing system 122). That is, the platform computing system 122 may first validate the API call by verifying the API token included in the call (e.g., by querying the token repository 144). Next, the platform computing system 122 authenticates the login credentials of the user 102 (e.g., via the security circuit 134, as described in the method 200).

Processes 328-340 may be completed substantially similar to the processes 230-242 of method 200. Accordingly, at process 328 the platform computing system 122 verifies, via the data management circuit, that the experience provider associated with the experience provider computing system 150 is designated for data sharing by the user 102 in the permissions repository 146 (or that the experience provider computing system 150 is designated directly in the permissions repository 146, via IP address, or a hardware identifier).

At process 330, the platform computing system 122 generates an access token for the experience provider to utilize in subsequent data sharing requests, and stores the generated access token in the token repository 144 (e.g., via an API call, or directly, via a native query in MySQL, PostgreSQL, etc.). In the exemplary embodiment, the access token is generated as an opaque access token.

At process 332, the platform computing system 122 provides (e.g., via an API response, over the network 118) the access token to the experience provider computing system 150. Therefore, the access token may be provided as a string of characters (e.g., in a JSON body of the response to the API call), which uniquely identify the successful data sharing request of the experience provider (e.g., associatively mapped to in the permissions repository 146).

At process 334 and 336, the experience provider computing system 150 receives the access token and generates a subsequent data sharing request (e.g., now containing the received access token of the user 102).

At process 338, the subsequent data sharing request (e.g., alternatively referred to as a request for data of the user 102) containing the access token is received by the access circuit 138 (e.g., via an API call, such as described above during process 322). Continuing the social media website example, process 338 represents the social media website making an authorized (e.g., containing the access token) request to access data of the user 102. Accordingly, at process 340, the platform computing system 122 provides (e.g., via the rules engine of the data management circuit 140) the data of the user 102 as identified by the access token (e.g., as associatively mapped to in the permissions repository 146). The data may be provided as a response to the API call, contained in the JSON body. It will be appreciated that in some embodiments, the platform computing system 122 may not store the aggregated data of the user 102 or only store the aggregated data of the user 102 temporarily (e.g., in order to provide to an experience provider in response to a data access request). Rather, in some embodiments, the platform computing system 122 may instead make an API call(s) to all eligible experience providers participating in the service of the platform 120, which requests the applicable data contained locally by each experience provider. Accordingly, in such embodiments, the platform computing system 122 may then aggregate the data of the user 102 on the fly (e.g., as the API call(s) return with responses), process it via the rules engine (e.g., of the data management circuit 140, as discussed further herein), and ultimately provide the applicable data (e.g., the data after rules have been applied) of the user 102 without storing it or after temporarily storing it. In some embodiments, the platform computing system 122 may generate and transmit an internal confirmation message (e.g., from one API to another) that confirms the data of the user 102 was provided to the experience provider. Therefore, at process 340, the social media website receives the data of the user (e.g., as identified by the access token), and may subsequently utilize the data to customize the experience of the user 102 (e.g., the experience of the user 102 while accessing the social media website).

It should be appreciated that a variety of API endpoints may exist for data sharing requests (containing the access token), such that the experience provider computing system 150 may make targeted API calls to the platform computing system 122. For example, the experience provider may have been granted access to a variety of data categories of the user 102, but may only be interested in a select few. The experience provider may be, for example, a fishing lure manufacturer, and thus, only interested in data categories pertaining thereto. That is, the fishing lure manufacturer may be interested in data relating to hobbies or travel plans, but may not have any interest in data relating to politics or religion. Accordingly, the experience provider computing system 150 may make specific API calls for only the subsets of data that they care about (e.g., hobbies and travel plans). For example, the platform computing system 122 may provide categorical API endpoints (e.g., https://api.provider.com/userdata/hobbies) in addition to broad API endpoints (e.g., https://api.provider.com/userdata/allavailable). Therefore, the categorical API endpoint (/hobbies) may return user data relating to hobbies only, while the broad API endpoint (/allavailable) may return all the available data of the user 102 (e.g., from the categories selected by the user 102 for sharing). Furthermore, the platform computing system 122 may also provide permission only API endpoints for experience providers that are only interested in what content is allowable (e.g., an experience provider that doesn't customize a service based on the user data). For example, an experience provider that operates as an auction website (e.g., via the experience provider computing system 150) may not be interested in the data of the user 102. That is, it may be too presumptuous to predict what item the user 102 is looking for based on the data (e.g., the experience provider would rather rely on the navigable structure of the website); however, the experience provider may still be interested in complying with the advertising preferences of the user 102. Accordingly, the experience provider may make an API call to, for example, an /allpermissions endpoint (e.g., structured as discussed above) and receive only the permission set of the user 102 as a response.

At process 342, the experience provider computing system 150 receives the data associated with the API call made (e.g., during the subsequent data sharing request of process 336). The experience provider may then use that data to dynamically tailor their user experience (e.g., for the user 102). Furthermore, the experience provider may also make additional API calls to access other information of the user 102 (e.g., as dictated by the permission settings), and to further refine the information they are receiving (e.g., as discussed above). Any additional API calls made by the experience provider computing system 150 may follow the same processes, beginning at process 336.

In some embodiments, a plurality of APIs can be used to carry out the processes of method 300. For example, a first API can be configured to facilitate communication of data between the user 102 and the platform computing system 122 (e.g., processes 302-304, 308-310, 314-316, and 320-326), and a second API can be configured to facilitate communication of data between the platform computing system 122 and the experience provider computing system(s) 150 (e.g., processes 310, 320-326, 332, and 338-340). However, it will be appreciated that any number of APIs could be used to carry out the processes of method 300. For example, more than one API could be configured to facilitate communication of data between the user 102 and the platform computing system 122 (e.g., processes 302-304, 308-310, 314-316, and 320-326), and likewise more than one API could be substituted for the second API discussed above. Furthermore, it will be appreciated that, for the experience providers, the APIs may be provided based on template APIs developed by the platform 120 and reused by the experience provider, or may be custom-written according to an API documentation (e.g., provided by the platform 120, such that the experience provider may conveniently access the endpoint functions of the data sharing and permissioning service).

As an illustrative example, consider a scenario where the user 102 rents a smart car for the day. Through the data sharing and permissioning service of the platform 120, the user 102 may safely enable the smart car to access data regarding the user's interests and habits. The user 102 may safely enable the smart car to access the data simply by associating the data sharing account with the smart car (e.g., logging into an interface of the smart car via the digital identity proxy or the secure pop-up of process 320). That is, even as part of a transient experience, the user 102 may conveniently, quickly, and securely enable data sharing with the smart car. Furthermore, the smart car, now empowered by the data of the user 102, may process and interpret the data of the user 102 to provide a dynamically tailored experience. The smart car may analyze the data of the user 102 and determine, for example, that the user 102 enjoys flash mobs, dancing, and adult beverages. Therefore, the smart car may set a nearby tavern, where a flash mob is about to congregate for a conga dance, as a self-driving destination. Accordingly, the smart car may begin to drive the user 102 to the destination (e.g., a hands-free, automated driving experience). Furthermore, the smart car may also communicate with the destination (e.g., via an API call to computing systems associated with the destination, perhaps routed through a third-party that manages online commerce for the destination) in order to make a reservation and to pre-pay any applicable cover charge (e.g., using a financial account of the user 102). Continuing the foregoing example, the smart car may also pre-order a favorite beverage of the user 102 (e.g., at a time that the smart car estimates the user will arrive). Thus, it should be appreciated that such seamless integration of user data with experience providers in a secure-manner facilitates a wide variety of direct and tangential improvements to user experiences in the digital world.

As another example, consider a scenario in which the user 102 enters a gym to exercise via an IoT-enabled exercise device (e.g., a bicycle, a rowing machine, a treadmill, etc.). Accordingly, subsequent to logging in to the exercise device with the data sharing and permissioning protocol, the exercise device may adjust a component(s) in order to provide a custom exercise experience. For example, the exercise device may analyze the data of the user 102 (e.g., either directly, or via a cloud-based data processing associated with the manufacturer of the exercise device) and determine various workout preferences of the user 102. That is, the exercise device may adjust: the brightness of a display component, the content of the display component (e.g., tune the display component to a favorite show of the user 102), and adjust the volume on an audio component (e.g., speakers that output the audio of the favorite show, a music player, a radio, etc.).

As a further example, consider a scenario in which the user 102 accesses an experience provider lodging and accommodations website in order to book a hotel room for an upcoming trip. Accordingly, upon logging into the experience provider website with the data sharing and permissioning protocol (e.g., logging into the experience provider website via the digital identity proxy or the secure pop-up of process 320), the lodging and accommodations website may receive the data of the user 102 and analyze it. That is, the experience provider website may analyze the data of the user 102 in order to provide a custom experience. For example, the experience provider website may notice (e.g., via analysis of the received data of the user 102) that the user 102 previously purchased plane tickets to visit Houston, Texas, in a month. Furthermore, the experience provider website may also notice that the user data doesn't indicate that the user 102 has any accommodations booked for that month. Therefore, the experience provider website may initially present the user 102 with a screen that displays Houston, Texas, hotel listings for the following month.

Figure 4:
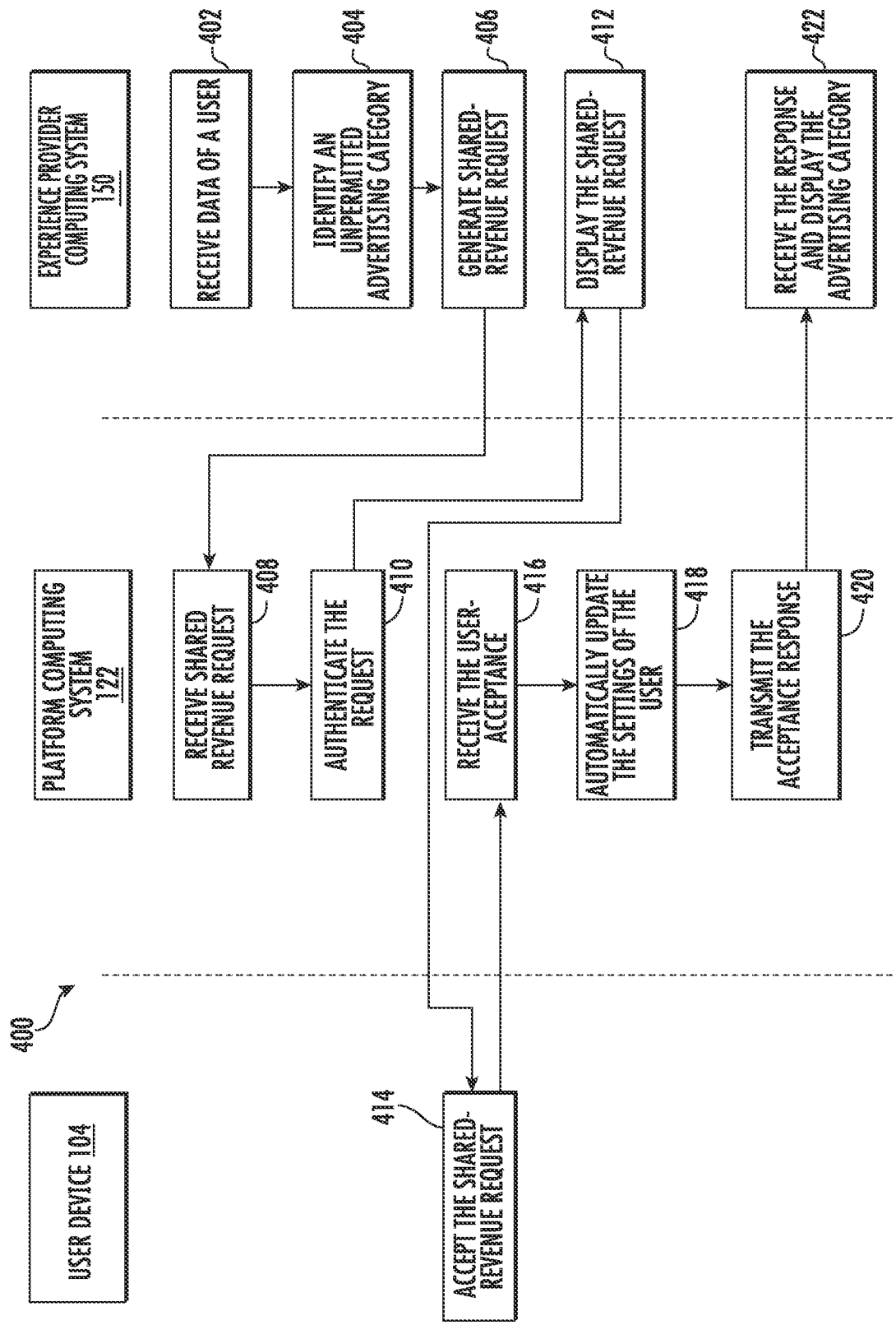
FIG. 4 is a flow diagram of a method for a data sharing and permissioning interaction with an experience provider, according to an example embodiment.

Now referring to FIG. 4, a flow diagram of a method 400 for a data sharing and permissioning interaction with an experience provider is shown, according to an example embodiment. As a broad overview, method 400 describes a basic advertising shared-revenue process (relative to FIG. 2) between the user 102 and an experience provider. Hence, an experience provider that wishes to access certain data, or display certain advertisements, of/to the user 102 may offer to pay the user 102 a modest sum to gain access to that data (e.g., in order to improve targeted advertising), and/or to display advertisements from a particular category to the user 102. As an example, method 400 may occur as part of a user (e.g., the user 102) visiting a website and subsequently receiving a real-time revenue sharing offer from the experience provider (e.g., displayed on the website, such as via a secure pop-up). That is, method 400 further describes displaying a shared-revenue request on a component of the experience provider computing system 150, in real-time and in response to the user 102 accessing the component, such as a website. Therefore, method 400 provides a practical example of simple advertisement revenue sharing between an experience provider (e.g., the social media web site or the sporting goods web site) and a user 102. Method 400 may be performed using the system of FIG. 1, and with similar implementation as the processes of method 200 and method 300, such that reference is made to the components of FIGS. 1, 2, and 3 in order to aid the description of method 400.

The method 400 begins at process 402 with the experience provider computing system 150 receiving data of a user (e.g., the user 102). Accordingly, in some embodiments, the method 400 may begin after process 242 or after process 342. Therefore, the method 400 begins after a successful initial exchange between the platform computing system 122 and the experience provider computing system 150 (e.g., a subsequent data sharing request was received with an access token and successfully processed).

At process 404, the experience provider computing system 150 analyzes the received user data and identifies an advertising category that the user 102 has opted out of viewing, but that is a category the experience provider would like to display (e.g., even at a reduced monetization rate). For example, referring back to the sporting goods website discussion, process 404 may include the experience provider computing system 150 (e.g., the sporting goods website computing system) analyzing the data of the user 102 and identifying that the user 102 has opted out of viewing advertisements relating to travel and finances.

Accordingly, at process 406, the experience provider computing system 150 generates and transmits (e.g., to the platform computing system 122) a shared-revenue request. The shared-revenue request may be structured similarly to the other requests (e.g., API calls) described herein. In an exemplary embodiment, the shared-revenue request is structured in the same manner as the request of process 322. That is, the shared-revenue request is an API call (e.g., received by the access circuit 138) containing the access token of the user 102 and an identifier of the experience provider (e.g., an API token or credential contained in the JSON body of the request). Additionally, the shared-revenue request also contains an offer from the experience provider (e.g., contained in the JSON body). The offer represents a revenue amount that the experience provider would like to give the user 102 as compensation for viewing advertisements from the advertising category identified in process 404 (e.g., 1 cent per view of travel advertisements). Furthermore, in the exemplary embodiment, as similar to process 322, the shared-revenue request may be structured to create a secure pop-up (e.g., an SSL encrypted connection to the platform computing system 122) that appears on the experience provider component (e.g., the website being served via the experience provider computing system 150).

At process 408, the platform computing system 122 receives the shared-revenue request of the experience provider (e.g., via the access circuit 138). Accordingly, at process 410, the shared-revenue request is authenticated. The authentication process may be two-fold, such that it requires authenticating the call itself (e.g., via an API token or other identifier of the experience provider, as discussed in process 322) and the user credentials (e.g., via the access token contained in the shared-revenue request). That is, the platform computing system 122 may first validate the API call by verifying the API token included in the call (e.g., by querying the token repository 144). Next, the platform computing system 122 authenticates the credentials of the user 102 (e.g., via an API call to the token repository 144, or directly, via a native query in MySQL, PostgreSQL, etc.). Reiteratively, the platform computing system 122 verifies that the access token is both contained, and not expired, in the token repository 144.

In some embodiments, the platform computing system 122 may require a new login of the user 102 (e.g., such as described during processes 322-326) in order to affect changes to the data sharing permissions. In other embodiments, the platform computing system 122 may track an active user-session of the user 102 (e.g., from an initial authentication process, as required for the access token generation). In such embodiments, the platform computing system 122 may track the active user-session based on the expiration of the access token (e.g., presuming the user 102 is active as long as the access token is active). In yet other embodiments, the platform computing system 122 may track the active user-session of the user 102 according to any variety of session tracking (e.g., cookies, a JWT token, etc.), occurring during the initial authentication via the secure pop-up, as exemplified in processes 322-326. Furthermore, in some embodiments, the platform computing system 122 may require a secondary authentication, such as a 2FA prompt (e.g., via the client application 114) or an email containing a selectable hyperlink.

At process 412, subsequent to the authentication of the platform computing system 122, the experience provider computing system 150 displays the secure pop-up (e.g., via a code block that initiates the secure connection to the platform computing system 122, displayed on a component, such as a website being used by the user 102). The secure pop-up may be structured by the platform computing system 122 to display a simple yes/no question to the user 102. For example, the secure-pop up may inform the user that "Would you like to allow experience provider X to display travel advertisements to you in exchange for 1 cent per view of travel advertisements?" Furthermore, the user 102 may be provided with selectable interaction points (e.g., a yes button and a no button) to facilitate a quick and convenient response. In embodiments where the user 102 selects no, the platform computing system 122 responds with a decline response to the experience provider computing system 150 (e.g., an API response, via the access circuit 138, that informs the experience provider computing system 150 that the user 102 is not interested in the offer). In such embodiments, no further action is taken beyond the API response. However, at process 414, in embodiments where the user 102 accepts the offer (e.g., by selecting the "yes" button on the secure pop-up) from the experience provider, the process may continue to 418.

Accordingly, at process 416, the platform computing system 122 receives the "yes" selection of the user (e.g., via the secure pop-up) and at process 418 automatically updates the data sharing and permissioning settings of the user 102. That is, the platform computing system 122 queries the permissions repository 146 (e.g., via an API call, or directly, via a native query in MySQL, PostgreSQL, etc.) and adjusts the associated permissions (e.g., associated with the experience provider) to reflect that the user 102 may now view travel advertisements in exchange for 1 cent per view (e.g., to be paid by the experience provider, as discussed further in FIG. 6). In some embodiments, the revenue-sharing arrangement is maintained in the permissions repository 146 until changed by either party (e.g., the user 102 de-selects the category again via the client application 114, or the experience provider makes a subsequent API call indicating a termination of the arrangement). In other embodiments, the revenue-sharing arrangement exists only for the lifespan of the access token (e.g., according to the expiration of the access token). In such embodiments, upon expiration of the access token, the platform computing system 122 automatically adjusts the associated permissions again (e.g., as described above) in order to reflect the termination of the arrangement. Thus, at a later time, when another data sharing request comes in from the experience provider, the access token generated will reflect the previous wishes of the user 102 (e.g., to not view political advertisements). At such a point, the experience provider computing system 150 may re-negotiate the arrangement (e.g., according to the applicable processes described in FIGS. 2, 4, and 5).

At process 420, the platform computing system 122 transmits the acceptance response (e.g., via an API response of the access circuit 138) to the experience provider computing system 150. Furthermore, in some embodiments, the API response may include the expiration of the arrangement (e.g., the response indicates that the user 102 has accepted the offer, but only temporarily during the lifespan of the current access token). In other embodiments, when the arrangement is similarly temporary, the platform computing system 122 may not immediately identify the expiration of the arrangement, but rather, refresh the permission set during the generation of the next access token (e.g., the current permissions identified by the access token, as described in the method 200). That is, continuing the sporting goods website example, at process 420 the platform computing system 122 informs (e.g., transmits) the sporting goods website that the user 102 has agreed to view travel-based advertisements in exchange for 1 cent per view.

At process 422, the experience provider computing system 150 receives the acceptance response from the platform computing system 122. Accordingly, the experience provider computing system 150 may then display advertisements from the advertising category identified in the arrangement (e.g., travel ads from the example). A tabulation of funds due (e.g., according to how many travel advertisements were displayed multiplied by the agreed upon revenue-sharing value) may then be provided by the experience provider computing system 150 (e.g., via an API call to the platform computing system 122) at a predetermined interval. In some embodiments, the tabulation of funds may be provided (e.g., via the access circuit 138) in real-time. That is, as each applicable advertisement is displayed, a tabulation of funds due is immediately transmitted. Furthermore, the platform computing system 122 may then verify the received tabulation of funds due (e.g., via the payments engine of the data management circuit 140). The funds due may be paid out by either the experience provider or the platform 120 (e.g., via the payments engine of the data management circuit 140). Accordingly, the platform computing system 122 may then verify the received tabulation of funds due and initiate a payment for the user 102 in the amount due (e.g., via the payments engine of the data management circuit 140). Details of the tabulation (e.g., the systematic count, record, or list) of funds due and the subsequent payout are further discussed in FIG. 6.

Furthermore, while the method 400 describes revenue sharing between the experience provider and the user 102 as it pertains to advertising, it will be appreciated that in some embodiments the user 102 may receive a shared-revenue offer simply for authorizing access to data. That is, the user 102 may receive an offer (e.g., $1, $3, etc.) from the experience provider to access data of the user 102. Such an offer may be in addition to, or separate from, any advertising agreements made. Additionally, it will be appreciated that the offer may also be in the form of an incentive, such as a discount for goods and/or services provided by the experience provider (e.g., 5% off a next purchase in exchange for access to data or advertising categories). Accordingly, funds due for revenue sharing regarding access to data (e.g., of the user 102) are included in the received tabulation. That is, in some embodiments, processes 402-404 may initially be directed to determining that the user 102 has not designated the experience provider for data sharing (e.g., after receiving a rejection response to a data access request from the platform computing system 122), and subsequently in process 406, generating a shared revenue request for access to data of the user 102. In such an alternative embodiment, the method 400 may continue similarly with the exception of the nature of the shared revenue request (e.g., being for general data sharing and not advertising categories). For example, at process 422, rather than display the advertising category in response to an acceptance from the user 102, the experience provider may access the data of the user 102 and utilize it to customize the experience of the user 102 (e.g., and generate a tabulation of funds due based on accessing the data). It will be appreciated that such an embodiment is not mutually exclusive to the advertising embodiment, but rather, may be in addition to the embodiment of method 400 that pertains specifically to advertising (e.g., first access to the data of the user 102 is negotiated, and then the advertising is negotiated).

In some embodiments, a plurality of APIs can be used to carry out the processes of method 400. For example, a first API can be configured to facilitate communication of data between the experience provider computing system 150 and the platform computing system 122 (e.g., processes 402, 406-412, and 422), a second API can be configured to facilitate communication of data between the user 102 and the platform computing system 122 (e.g., processes 406 and 410-416), and a third API can be configured to facilitate communication of the shared-revenue request result between the platform computing system 122 and the experience provider computing system 150 (e.g., processes 420-422). However, it will be appreciated that any number of APIs could be used to carry out the processes of method 400. For example, more than one API could be configured to facilitate communication of data between the experience provider computing system 150 and the platform computing system 122 (e.g., processes 402, 406-412, and 422), and likewise more than one API could be substituted for the second API and the third API discussed above. Furthermore, it will be appreciated that, for the experience providers, the APIs may be provided based on template APIs developed by the platform 120 and reused by the experience provider, or may be custom-written according to an API documentation (e.g., provided by the platform 120, such that the experience provider may conveniently access the endpoint functions of the data sharing and permissioning service).

Figure 5:
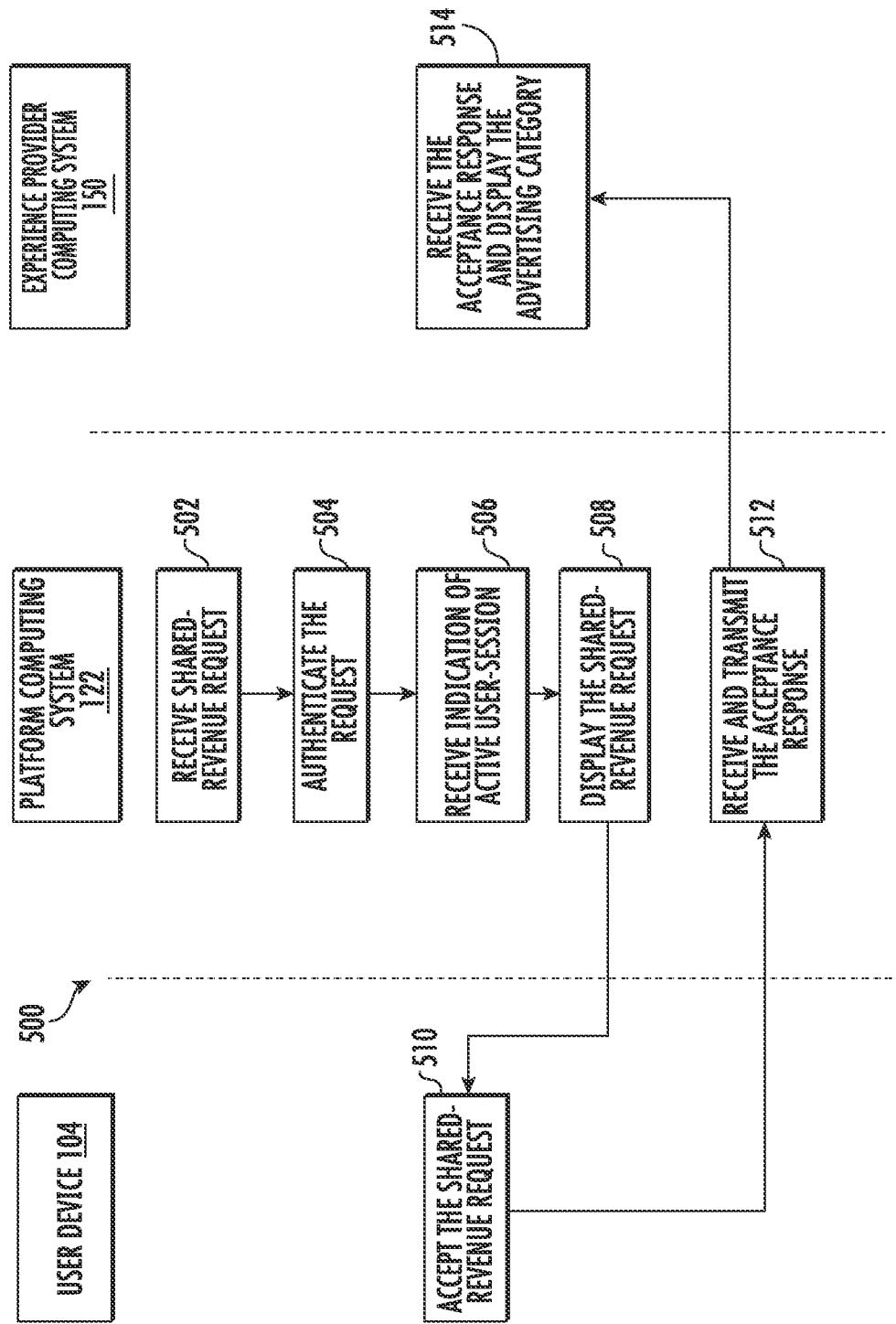
FIG. 5 is a flow diagram of a method for a data sharing and permissioning interaction with an experience provider, according to another example embodiment.

Now referring to FIG. 5, a flow diagram of a method 500 for a data sharing and permissioning interaction with an experience provider is shown, according to an example embodiment. As a broad overview, method 500 describes a basic advertising shared-revenue process (relative to FIG. 2) between the user 102 and an experience provider, according to a different example embodiment than method 400. Hence, an experience provider that wishes to access certain data, or display certain advertisements, of/to the user 102 may offer to pay the user 102 a modest sum to gain access to that data (e.g., in order to improve targeted advertising), and/or to display advertisements from a particular category to the user 102. As an example, method 500 may occur as part of a user (e.g., the user 102) receiving a revenue sharing offer (e.g., in real-time and responsive to the user 102 visiting the website, in some embodiments) from the experience provider (e.g., displayed on the client application 114). That is, method 500 further describes displaying a shared-revenue request on a component of the platform computing system 122 (rather than via the component of the experience provider, as described in FIG. 4). Therefore, method 500 provides a practical example of simple advertisement revenue sharing between an experience provider (e.g., the social media website or the sporting goods website) and a user 102. Method 500 may be performed using the system of FIG. 1, and with similar implementation as the processes of method 200 and method 300, such that reference is made to the components of FIGS. 1, 2, and 3 in order to aid the description of method 400.

Method 500 further describes displaying a simplified shared-revenue request (e.g., similar to FIG. 4) on a component of the platform computing system 122, such as via a messaging center of the client application 114. Therefore, method 500 provides a practical example of simple advertisement revenue sharing between an experience provider (e.g., the social media website or the sporting goods website) and a user 102, which is displayed on a component of the platform computing system 122. Method 500 may be performed using the system of FIG. 1, and with similar implementation as the processes of method 200, method 300, and method 400, such that reference is made to the components of FIGS. 1, 2, 3, and 4 in order to aid the description of method 500.

The method 500 begins at process 502 with the platform computing system 122 receiving a shared-revenue request (e.g., from an experience provider computing system 150, regarding the user 102). Accordingly, in some embodiments, the method 500 may begin after process 242 or after process 342. Therefore, the method 500 begins after a successful initial exchange between the platform computing system 122 and the experience provider computing system 150 (e.g., a request for data of the user was received with an access token and successfully processed).

The received shared-revenue request may be structured substantially similar to the shared-revenue request of process 322 and processes 406-408. That is, the shared-revenue request is an API call (e.g., received by the access circuit 138) containing the access token of the user 102 and an identifier of the experience provider (e.g., an API token or credential contained in the JSON body of the request). Additionally, the shared-revenue request also contains an offer from the experience provider (e.g., contained in the JSON body) and a response-URL. The offer represents a revenue amount that the experience provider would like to give the user 102 as compensation for viewing advertisements from an advertising category that the user 102 has opted out of viewing (e.g., identified, for example, in process 404). The response-URL is a URL designated by the experience provider computing system 150 for responses that exceed the timeout threshold (e.g., a maximum amount of time before a request expires—variably determined by each experience provider). Accordingly, should there be delay (e.g., such as awaiting a response to a pending message, as discussed in processes 508-510), the platform computing system 122 may initiate an API call (e.g., via the access circuit 138) to the response-URL defined in the request (e.g., contained in the JSON body). Furthermore, the shared-revenue request may be retrievably stored (e.g., in the user data repository 148) for display at a later time (e.g., during an active user-session, as discussed below). In that same vein, the response-URL is also retrievably stored (e.g., as existing as part of the shared-revenue request) for initiating a response at a later time.

At process 504, the platform computing system 122 authenticates the received shared-revenue request. Process 504 may be completed substantially similar to process 410. That is, the authentication process may be two-fold, such that it requires authenticating the call itself (e.g., via an API token or other identifier of the experience provider, as discussed in process 322) and the user credentials (e.g., via the access token contained in the shared-revenue request). That is, the platform computing system 122 may first validate the API call by verifying the API token included in the call (e.g., by querying the token repository 144). Next, the platform computing system 122 authenticates that the identified user 102 (e.g., via an API call to the token repository 144, or directly, via a native query in MySQL, PostgreSQL, etc.). Reiteratively, the platform computing system 122 verifies that the access token is both contained, and not expired, in the token repository 144.

At process 506, the platform computing system 122 receives an indication of an active user-session (e.g., a session of the user 102) in the client application 114 (e.g., via an API call). In some embodiments, the indication may be received in the form of the user 102 logging into the client application 114 (e.g., logging into a mobile application or a website of the platform 120). In other embodiments, the shared-revenue request may be received after the user 102 has already logged in to the client application 114, and the indication may take the form of any current activity of the user 102 via the client application 114 (e.g., changing menus, adjusting settings, etc.).

At process 508, the platform computing system 122 displays the shared-revenue request to the user 102. In some embodiments, the platform computing system 122 may first retrieve the shared-revenue request from the user data repository 148 (e.g., when there is a delay between receiving the request and the next active user-session). Furthermore, in some embodiments, the platform computing system 122 may display the request as a pop-up on the generated graphical user interface of the client application 114 (e.g., via the interface circuit 136). In other embodiments, the platform computing system 122 may alert the user 102 of a pending offer by dynamically marking an alert and notification area of the user interface (e.g., a messaging center). For example, the client application 114 may display (e.g., via the interface circuit 136) an area on the user interface containing a selectable icon indicative of a messaging center (e.g., an envelope, a stack of documents, etc.). Upon receiving a shared-revenue request (or any other alert/notification, as further discussed in FIG. 6), the interface circuit 136 may dynamically mark, or adjust, the selectable icon to indicate a new matter requiring attention from the user 102. In some embodiments, the selectable icon may have the contrast dynamically adjusted (e.g., made darker or lighter). In other embodiments, the selectable icon may be adjoined to another icon (e.g., such as a numerical counter displayed, for example, over the top of the messaging icon).)

At process 510, the user 102 accepts the shared-revenue request (e.g., via the client application 114) and transmits it to the platform computing system 122 (e.g., via an API call over the network 118). For example, the user 102 may notice the dynamically marked aspect of the user interface (e.g., displayed via the client application 114) and subsequently select (e.g., click) the area. In response, the user 102 is taken to a new page of the client application 114 (e.g., the messaging center). From there, the user 102 may select and read any messages (e.g., alerts and/or notifications) waiting for the user (e.g., contained in the user data repository 148). Continuing the example, the user 102 may select a message correlating to the shared-revenue request and read the offer (e.g., the message opened as a new page, a new sub-area of the current page, or as a pop-up). The message may be structured similarly to the secure pop-up of process 412. That is, it may contain a simple question (e.g., "Would you like to allow experience provider X to display political advertisements to you in exchange for 1 cent per view of political advertisements?"), and selectable interaction points for the response (e.g., a yes/no button). Therefore, at process 510, the user 102 reads the message and selects the selectable interaction point to agree (e.g., the "yes" button). The platform computing system 122 then receives the selection (e.g., over the network 118, via the client application 114, received by the access circuit 138). In embodiments where the user 102 selects the "no" button, the method 500 may conclude with a decline response to the experience provider computing system 150 (e.g., an API response, via the access circuit 138, that informs the experience provider computing system 150 that the user 102 is not interested in the offer). In such embodiments, no further action is taken beyond the API response.

At process 512, the platform computing system 122 receives and transmits the acceptance response (e.g., via an API response of the access circuit 138) to the experience provider computing system 150. Similar to process 418, as part of receiving the "yes" selection of the user 102, the platform computing system 122 automatically updates the data sharing and permissioning settings of the user 102. That is, the platform computing system 122 queries the permissions repository 146 (e.g., via an API call, or directly, via a native query in MySQL, PostgreSQL, etc.) and adjusts the associated permissions (e.g., associated with the experience provider) to reflect that the user 102 may now view political advertisements in exchange for 1 cent per view (e.g., to be paid by the experience provider, as discussed further in FIG. 6). In some embodiments, the revenue-sharing arrangement is maintained in the permissions repository 146 until changed by either party (e.g., the user 102 de-selects the category again via the client application 114, or the experience provider makes a subsequent API call indicating a termination of the arrangement). In other embodiments, the revenue-sharing arrangement exists only for the lifespan of the access token (e.g., according to the expiration of the access token). In such embodiments, upon expiration of the access token, the platform computing system 122 automatically adjusts the associated permissions again (e.g., as described above) in order to reflect the termination of the arrangement. Thus, at a later time, when another data sharing request comes in from the experience provider, the access token generated will reflect the previous wishes of the user 102 (e.g., to not view political advertisements). At such a point, the experience provider computing system 150 may re-negotiate the arrangement (e.g., according to the applicable processes described in FIGS. 2, 4, and 5).

Furthermore, in embodiments where there is a delay between the shared-revenue request and the next active user-session of the user 102, the platform computing system 122 response may be directed to the experience provider computing system 150 as a new API call. The new API call may utilize the response-URL contained in the shared-revenue request (e.g., the platform computing system 122 may initiate the API call by responding to the experience provider designated URL contained in the JSON body of the shared-revenue request). In some embodiments, the new API call (e.g., the delayed response) may include the expiration of the arrangement (e.g., the call indicates that the user 102 has accepted the offer, but only temporarily during the lifespan of the current access token). In other embodiments, when the arrangement is similarly temporary, the platform computing system 122 may not immediately identify the expiration of the arrangement, but rather, refresh the permission set during the generation of the next access token (e.g., the current permissions identified by the access token, as described in the method 200).

At process 514, the experience provider computing system 150 receives the acceptance response from the platform computing system 122 (e.g., in some embodiments, receives the acceptance response at a later time, in the form of the new API call as discussed above). Accordingly, the experience provider computing system 150 may then display advertisements from the advertising category identified in the arrangement (e.g., political ads from the example). A tabulation of funds due (e.g., according to how many political advertisements were displayed multiplied by the agreed upon revenue-sharing value) may then be provided by the experience provider computing system 150 (e.g., via an API call to the platform computing system 122) at a predetermined interval. In some embodiments, the tabulation of funds may be provided (e.g., via the access circuit 138) in real-time. That is, as each applicable advertisement is displayed, a tabulation of funds due is immediately transmitted. Furthermore, the platform computing system 122 may then verify the received tabulation of funds due (e.g., via the payments engine of the data management circuit 140). Accordingly, the platform computing system 122 may then verify any received tabulation of funds due (e.g., via the payments engine of the data management circuit 140). The funds due may be paid out by either the experience provider or the platform 120 (e.g., via the payments engine of the data management circuit 140). Details of the tabulation of funds and the subsequent payout are further discussed in FIG. 6.

Furthermore, while the method 500 describes revenue sharing between the experience provider and the user 102 as it pertains to advertising, it will be appreciated that in some embodiments the user 102 may receive a shared-revenue offer simply for authorizing access to data. That is, the user 102 may receive an offer (e.g., $1, $3, etc.) from the experience provider to access data of the user 102. Such an offer may be in addition to, or separate from, any advertising agreements made. Accordingly, funds due for revenue sharing regarding access to data (e.g., of the user 102) are included in the received tabulation.

In some embodiments, a plurality of APIs can be used to carry out the processes of method 500. For example, a first API can be configured to facilitate communication of data between the user 102 and the platform computing system 122 (e.g., processes 504-512), and a second API can be configured to facilitate communication of data between the platform computing system 122 and the experience provider computing system(s) 150 (e.g., processes 502-504 and 510-514). However, it will be appreciated that any number of APIs could be used to carry out the processes of method 500. For example, more than one API could be configured to facilitate communication of data between the user 102 and the platform computing system 122 (e.g., processes 504-512), and likewise more than one API could be substituted for the second API discussed above. Furthermore, it will be appreciated that, for the experience providers, the APIs may be provided based on template APIs developed by the platform 120 and reused by the experience provider, or may be custom-written according to an API documentation (e.g., provided by the platform 120, such that the experience provider may conveniently access the endpoint functions of the data sharing and permissioning service).

Figure 6:
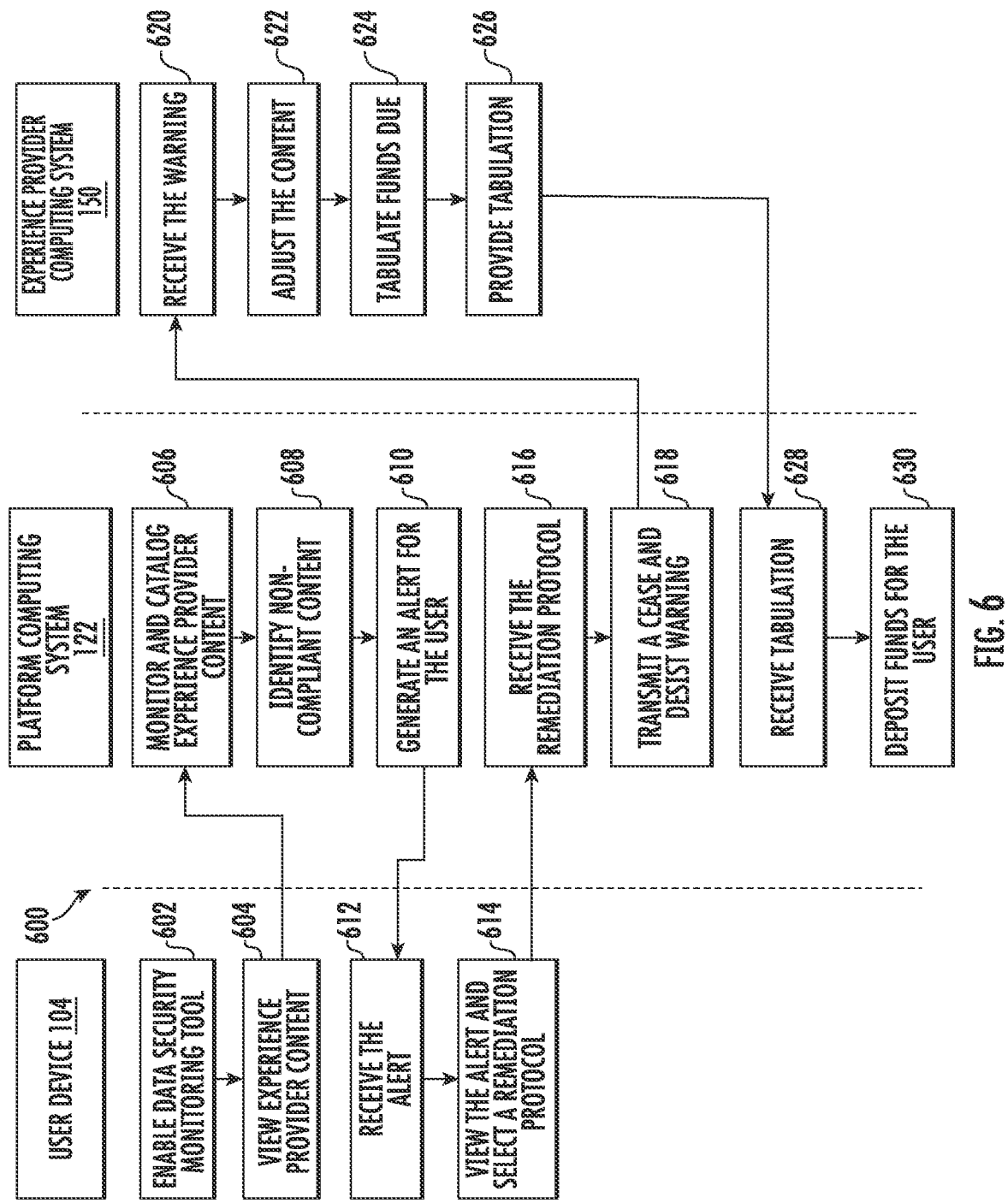
FIG. 6 is a flow diagram of a method for a data sharing and permissioning interaction with an experience provider, according to yet another example embodiment.

Referring now to FIG. 6, a flow diagram of a method 600 for a data sharing and permissioning interaction with an experience provider is shown, according to an example embodiment. As a broad overview, method 600 describes the regulatory, monitoring, remediation, and payment processing aspects of a data sharing event (e.g., data of the user 102 provided to an experience provider computing system 150). Therefore, method 600 discusses data sharing and revenue sharing (e.g., similar to methods 200, 300, 400, and 500); however, method 600 further elaborates on the enforcement of the settings of the user 102 and any applicable payments associated with shared-revenue agreements. Accordingly, by participating in the service of the platform 120, the experience provider may offload the duty of being the arbiter of what advertisements users receive. Furthermore, through the remediation protocols of the data sharing and permissioning service, the experience provider may be immediately notified of non-compliance, thus substantially reducing the risk associated with providing customized content to the user 102 (e.g., regulatory risk, reputation risk, etc.).

Method 600 may be performed using the system of FIG. 1, and with similar implementation as the processes of method 200, method 300, method 400, and method 500, such that reference is made to the components of FIGS. 1, 2, 3, 4, and 5 in order to aid the description of method 600.

The method 600 begins at process 602 with the user 102 selecting an option (e.g., provided via the graphical user interface of the client application 114), which enables a data security monitoring tool of the platform computing system 122. It should be appreciated that the process 602 may occur at any point in the various embodiments described here. That is, the data security monitoring tool may be enabled (e.g., via the client application 114) at the discretion of the user 102. For the sake of discussion, method 600 is described herein as occurring subsequent to a successful data sharing request (e.g., alternatively referred to as a request for data of the user 102, such as after processes 242 and 340).

In some embodiments, the data security monitoring tool may be provided as part of the client application 114. For example, the data security monitoring tool may be included in the client application 114 and activated at the request of the user 102 (e.g., a user selection made via the graphical user interface). That is, in embodiments where the user device 104 is a mobile device (e.g., a cellphone, a tablet, smart glasses, etc.), the data security monitoring tool may be accessed via the graphical user interface of the client application 114. In other embodiments, the client application 114 may prompt the user 102 to download an additional package in order to enable the data security monitoring tool (e.g., a mobile application downloaded via, for example, the Google Play Store or the iOS store, and associated with the platform 120). In the same vein, in embodiments where the client application 114 is structured as a cloud-based asset (e.g., a webpage), the platform computing system 122 may prompt the user 102 (e.g., a pop-up, or notification, displayed on the webpage 114) to download and install a web browser extension containing the data security monitoring tool (e.g., a browser extension maintained and provided by the platform 120). Furthermore, in yet other embodiments, the data security monitoring tool may additionally utilize a virtual private network (VPN) provided by, or otherwise associated with, the platform 120. In such embodiments, the user 102 may connect the user device 104 to the VPN of the platform 120 (e.g., thus tunneling the internet traffic of the user 102 through the secure VPN of the platform 120). In this way, the user 102 may route activity data directly through the platform computing system 122, and therefore, enable the platform computing system 122 to have a comprehensive view of the activity occurring between the user 102 and the experience provider computing system 150 (e.g., the modalities of operation for the data security monitoring tool are discussed further below, with reference to process 606 and 608).

At process 604, the user 102 proceeds to access content of the experience provider (e.g., via the experience provider computing system 150) with the data security monitoring tool enabled. For example, the user 102 may access content of the experience provider via a website, an application associated with the experience provider, a smart-device that communicates with the experience provider computing system 150, etc. That is, the user 102 accesses content of the experience provider with the data security monitoring tool enabled as one of a component (or as an additional package) of the client application 114 or a browser extension, and optionally while connected to the VPN of the platform 120.

At process 606, the platform computing system 122 monitors and catalogs (e.g., monitored via the data security monitoring tool, communicated via an API call or directly-inspected such as via the VPN) the experience provider content, accessed by the user 102 in process 604. For example, the platform computing system 122 may utilize the data security tool (e.g., via the client application 114, or via the browser extension) to inspect and analyze the content shown to the user 102. In some embodiments, the data security monitoring tool may inspect the source code for the experience provider content (e.g., a website), including executable scripts and metadata associated with the content (e.g., a set of data that describes and provides information about other data). Accordingly, the platform computing system 122 may then compare the inspected source code with a list of data aggregated from advertising servers in order to ascertain categorical information about the content. In some embodiments, the list of data from advertising servers is aggregated and maintained by the platform 120. In other embodiments, the list of data from advertising servers is provided and maintained by an experience provider. In yet other embodiments, the list of data from advertising servers is a collaborative effort between an experience provider and the platform 120.

Furthermore, in some embodiments, the data security monitoring tool may run the source code in a sandbox environment in order to ascertain the categorical information about the content. The sandbox environment is an isolated virtual machine, associated with the platform computing system 122, in which potentially unsafe software code can execute without affecting network resources or local applications. Thus, the platform computing system 122 may run the source code of the experience provider content in a safe environment, and subsequently inspect and analyze the results directly (e.g., via code analysis and interpretation of the results, including the use of image recognition logic). In some embodiments, the platform computing system 122 may also utilize the VPN connection, where applicable, to further analyze the content of the experience provider by directly inspecting the data packets exchanged by the user device 104 and the experience provider computing system 150. In this manner, the platform computing system 122 may directly inspect all unencrypted traffic (e.g., via a Deep Packet Inspection (DPI) algorithm). It should be appreciated that the exemplary embodiment encompasses the user 102 utilizing the data security monitoring tool in conjunction with the VPN service of the platform 120. In this manner, the experience provider content may be thoroughly inspected and analyzed, while simultaneously capturing the activity data of the user 102 (e.g., for retrievable storage in the user data repository 148). Accordingly, the platform computing system 122 may then catalog the activity data of the user 102 and store it in the user data repository 148.

At process 608, the platform computing system 122 identifies (e.g., via the data security monitoring tool) non-compliant content being served to the user 102, via the experience provider computing system 150. For example, the platform computing system 122 may identify (e.g., subsequent to the analysis of process 606) a script, or other component of the experience provider content, that generates advertisements from a category (e.g., according to the classification scheme) opted out of by the user 102 (e.g., as identified in the permissions repository 146).

At process 610, the platform computing system 122 generates an alert for the user 102, and provides it via the client application 114 (e.g., over the network 118). In some embodiments, the platform computing system 122 may display the alert as a secure pop-up (e.g., similar to processes 226-228 and 320) on the generated graphical user interface of the client application 114 (e.g., via the interface circuit 136). In other embodiments, the platform computing system 122 may notify the user 102 of the pending alert by dynamically marking an alert and notification area of the user interface (e.g., a messaging center displayed via the client application 114). For example, the client application 114 may display (e.g., via the interface circuit 136) an area on the user interface containing a selectable icon indicative of a messaging center (e.g., an envelope, a stack of documents, etc.). Upon receiving the non-compliant content alert, the interface circuit 136 may dynamically mark, or adjust, the selectable icon to indicate a new matter requiring attention from the user 102. In some embodiments, the selectable icon may have the contrast dynamically adjusted (e.g., made darker or lighter). In other embodiments, the selectable icon may be adjoined to another icon (e.g., such as a numerical counter displayed, for example, over the top of the messaging icon).

The alert may be structured to inquire of the user 102 about the identified non-compliant content and to offer a remediation protocol. For example, the alert may state that "We noticed that Experience provider X is showing advertisements from a category you opted out of: Sports. Would you like to transmit a cease and desist warning or disconnect from Experience provider X's services?" The alert may be further structured such that the user 102 may be provided with selectable interaction points (e.g., a "Warn" button and a "Disconnect" button) to facilitate a quick and convenient response.

At processes 612 and 614, the user 102 receives the alert (e.g., via the client application 114), views the alert (e.g., selects a selectable icon that displays the alert), and selects a remediation protocol (e.g., warn or disconnect). In embodiments where the user 102 selects the option to disconnect, the client application 114 may temporarily block all data exchange between the user device 104 and the experience provider computing system 150 (e.g., for an hour, a day, a week, etc., as predetermined by the platform 120). In such embodiments, the method 600 continues at process 624. However, in embodiments where the user 102 selects the option corresponding to warning the experience provider, the method 600 continues at process 616 (e.g., after communicating the remediation protocol selection of the user 102 to the platform computing system 122 via an API call).

At process 616, the platform computing system 122 receives the remediation selection of the user 102 (e.g., a selection to warn the experience provider, via the client application 114). At process 618, the platform computing system 122 generates and transmits a cease and desist warning to the experience provider computing system 150. The cease and desist warning may be transmitted as an API call (e.g., via the access circuit 138) to the experience provider computing system 150. Furthermore, the cease and desist warning may include (e.g., in the JSON body of the call) the access token of the user 102 (e.g., to identify the non-compliant user experience), the non-compliant advertising category, and in some embodiments, a punitive measure. That is, in some embodiments, the platform computing system 122 may impose a punitive measure on the experience provider for the non-compliant advertising. The punitive measure may be in the form of a financial penalty, a service penalty (e.g., a temporary lockout from data sharing requests), or a regulatory penalty (e.g., reporting the non-compliance to an applicable regulatory oversight department).

At process 620, the experience provider computing system 150 receives the cease and desist warning (e.g., the API call, over the network 118). Accordingly, at process 622, the experience provider computing system 150 adjusts the content being served to the user 102. Thus, continuing the example, the experience provider computing system 150 may make the corrections necessary (e.g., based on the infrastructure and implementation of the experience provider computing system 150) in order to prevent any further non-compliant advertisements from reaching the user 102.

At process 624, the experience provider computing system 150 tabulates the funds due to the user 102 (e.g., based on any shared-revenue agreements, as discussed previously, with reference to FIGS. 2, 3, 4, and 5). The experience provider computing system 150 may tabulate the funds due in real-time, as particular advertisements are served and viewed, or at predetermined intervals. For example, the experience provider computing system may generate a data structure (e.g., a JSON-formatted dictionary/list, for an API call) containing associative entries, which identify the shared-revenue advertisements that were served to the user 102, and the corresponding financial compensation due. In some embodiments, the generated data structure may contain additional data, such as a timestamp identifying the date and time that the advertisement was served, a portion of funds due to the platform 120 (e.g., where applicable, as discussed in FIG. 2), and a currency type for the funds due (e.g., United States Dollar). Furthermore, in embodiments where the user 102 selected to disconnect from the experience provider service (e.g., as discussed in process 614), the experience provider computing system 150 is required to tabulate the funds due at the time of disconnection.

At process 626, the experience provider computing system 150 transmits the data structure containing the tabulation of funds due to the platform computing system 122 (e.g., via an API call structured as discussed above, over the network 118). At process 628, the platform computing system 122 receives the tabulation of funds (e.g., via the access circuit 138). The platform computing system 122 may then verify the tabulation of funds due (e.g., via the payments engine of the data management circuit 140). That is, the platform computing system 122 may traverse the received data structure and verify the calculations (e.g., advertisements served multiplied by the agreed-upon price per view).

Therefore, at process 630, the platform computing system 122 deposits the funds due (e.g., as identified by the tabulation of funds due) into an account of the user 102 (e.g., via the payments engine of the data management circuit 140). In some embodiments, the experience provider computing system 150 may first transfer the funds due to an account associated with the platform computing system 122 (e.g., a distribution account established for paying shared-revenue agreements). In other embodiments, the platform 120 may settle funds due with the experience provider associated with the experience provider computing system 150 at a predetermined interval (e.g., as dictated by a contract or agreement between the platform 120 and the experience provider). The account of the user 102 may be a financial account (e.g., entered during registration, as discussed in FIG. 3), or any other account of the user 102 that may receive funds (e.g., entered via the client application 114). For example, the account may be a gift card, a prepaid card, a rewards account, etc. Furthermore, in embodiments where the platform 120 is a financial institution, or associated with a financial institution, the account may be an account held by the user 102 with the platform 120 (e.g., an account held with the platform 120 and selected from the prepopulated list during registration, as described in process 310).

Furthermore, while the method 600 describes revenue sharing between the experience provider and the user 102 as it pertains to advertising, it will be appreciated that in some embodiments the user 102 may receive a shared-revenue offer simply for authorizing access to data. That is, the user 102 may receive an offer (e.g., $1, $3, etc.) from the experience provider to access data of the user 102. Such an offer may be in addition to, or separate from, any advertising agreements made. Accordingly, funds due for revenue sharing regarding access to data (e.g., of the user 102) are included in the received tabulation.

In some embodiments, a plurality of APIs can be used to carry out the processes of method 600. For example, a first API can be configured to facilitate communication of data between the user 102 and the platform computing system 122 (e.g., processes 606 and 610-616), and a second API can be configured to facilitate communication of data between the platform computing system 122 and the experience provider computing system(s) 150 (e.g., processes 618-620 and 626-628). However, it will be appreciated that any number of APIs could be used to carry out the processes of method 600. For example, more than one API could be configured to facilitate communication of data between the user 102 and the platform computing system 122 (e.g., processes 606 and 610-616), and likewise more than one API could be substituted for the second API discussed above. Furthermore, it will be appreciated that, for the experience providers, the APIs may be provided based on template APIs developed by the platform 120 and reused by the experience provider, or may be custom-written according to an API documentation (e.g., provided by the platform 120, such that the experience provider may conveniently access the endpoint functions of the data sharing and permissioning service).

Additionally, at the conclusion of methods 200, 300, 400, 500, and 600, the user 102 may be presented with a voting interface (e.g., generated via the interface circuit 136 and displayed on the client application 114), which prompts the user 102 to provide a rating for the experience provider based on how well the experience provider complied with the preferences and settings of the user 102 (e.g., during the activity session). The rating may be based on a scale of the platform 120 (e.g., 5 stars, 1-10, etc.) and subjectively determined according to the experience of the user 102. Furthermore, the ratings may be aggregated and averaged by the platform computing system 122, and subsequently provided to other users (e.g., during registration, configuration processes, and via a centralized location, such as a ratings website maintained by the platform 120). Accordingly, through such experience transparency, experience providers are incentivized both to adhere to the preferences of the user 102 and to provide updated activity data to the platform computing system 122 (e.g., in order to avoid social backlash or ill will).

While methods 200, 300, 400, 500, and 600 are described as being separate and distinct from one another, it will be appreciated that some processes of methods 200, 300, 400, 500, and 600 are the same or similar to one another, that some methods may include all of the processes of another method, some methods may not include any processes of another method, and some methods may include some processes but not all processes of another method.

Furthermore, in some embodiments, it will be appreciated that the platform computing system 122 applies (e.g., via the rules engine of the data management circuit 140) all applicable regulatory and privacy requirements to the methods of 200, 300, 400, 500, and 600. The applicable regulatory and privacy requirements may be determined according to the rules utilized by the rules engine (e.g., the rules being regularly configured and updated, as discussed in FIG. 1). That is, the platform computing system 122 may adjust (e.g., by the data management circuit 140, via the interface circuit 136) the data sharing and permissioning interfaces to prevent the user 102 from attempting to share, for example, health and/or financial information protected by law (e.g., Health Insurance Portability and Accountability Act (HIPAA)). For example, in some embodiments, the platform computing system 122 may not display data categories for data associated with such regulations (e.g., preventing the user 102 from making a selection to share the associated data). In other embodiments, the platform computing system 122 may only display such data categories after receiving (e.g., a document upload via the graphical user interface of the client application 114) the required authorization documents (e.g., to share medical data with a new doctor). Furthermore, the platform computing system 122 may actively analyze (e.g., via the data management circuit 140) the data of the user 102 (e.g., in real-time during updates or at predetermined intervals) and move all such data protected by regulatory law to protected categories (e.g., in the user data repository 148) in order to prevent accidental distribution of the protected data.

Figure 7:
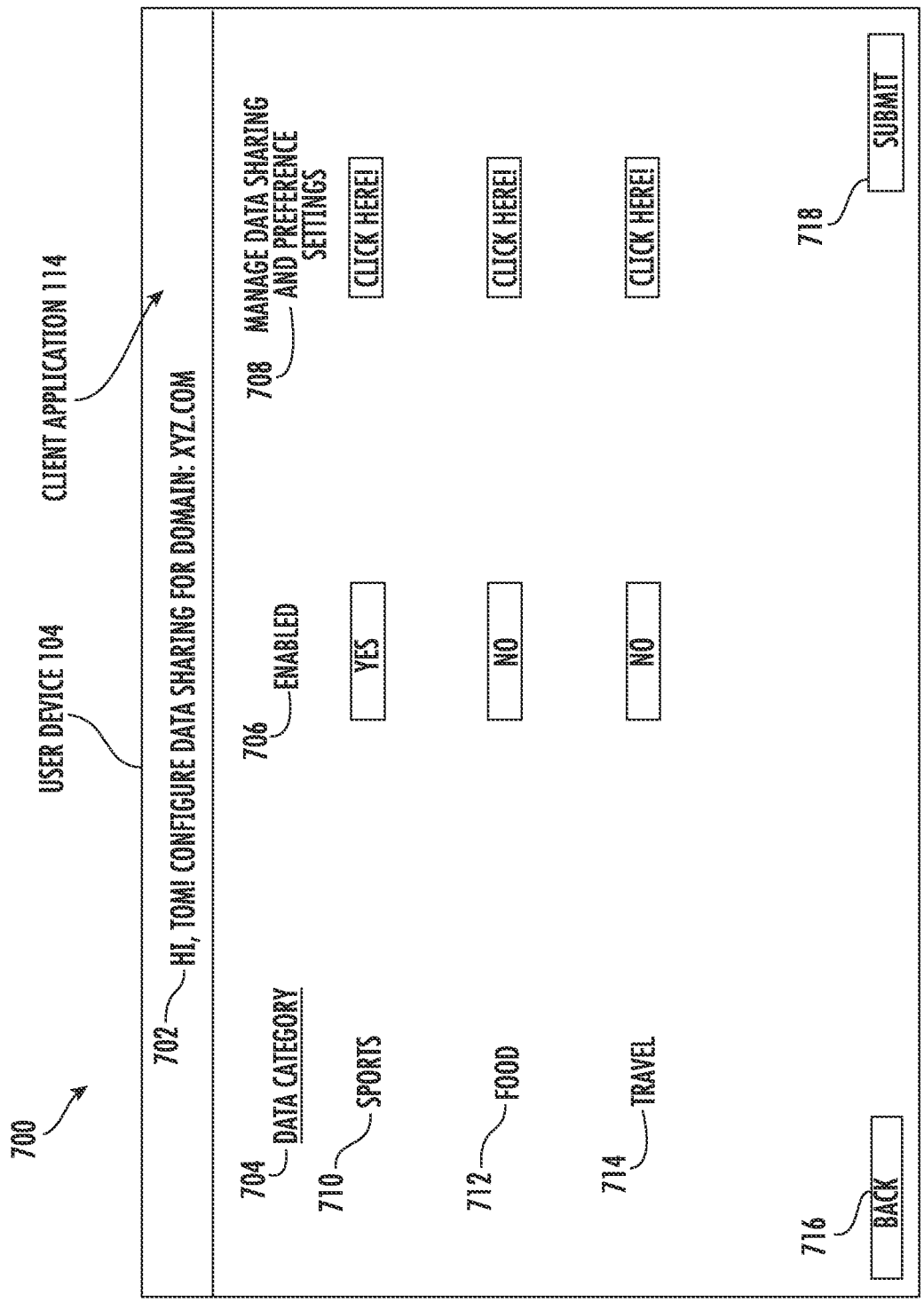
FIG. 7 is an illustration of a dynamic graphical user interface displayed on a user device as part of a data sharing process, according to an example embodiment.

Referring now to FIG. 7, an illustrative example of a dynamic graphical user interface 700, displayed on the user device 104 as part of a data sharing process is shown, according to an example embodiment. In the depicted embodiment, the user device 104 includes a display showing the graphical user interface 700 (e.g., provided by the client application 114, via the interface circuit 136), which is structured to facilitate a user (e.g., the user 102) to configure data sharing for an identified experience provider, as described in the method 200.

The user interface of 700 includes a title bar 702; section columns 704, 706, and 708; section rows 710, 712, and 714; a "BACK" button 716; and a "SUBMIT" button 718. The title bar 702 is depicted as a textual (e.g., string) display title, which informs the user as to the purpose of the display. The title bar 702 is structured to dynamically update (e.g., via the interface circuit 136, displayed by the client application 114) as the user 102 navigates around the client application 114. Accordingly, the title bar 702 informs the user 102 that the purpose of the graphical user interface 700 is to configure data sharing for the experience provider domain "XYZ.COM".

The section columns 704, 706, and 708 are depicted as textual (e.g., string) column titles that identify the data held in the rows below them. For example, section column 704, "DATA CATEGORY", identifies the contents of the rows below as data category labels. Continuing, section column 706, "ENABLED", identifies the contents of the rows below as a selectable Boolean attribute (e.g., to enable/disable data sharing from the associated data category, with the experience provider identified in the display title). Section column 708, "MANAGE DATA SHARING AND PREFERENCE SETTINGS" identifies the contents of the rows below as a selectable interaction point, which when selected brings the user 102 to a display (not depicted) that enables the user 102 to create more narrow subsets of the correlated data category (e.g., such as described in processes 204 and 206).

Therefore, the section rows 710, 712, and 714 represent an operative view of each data category, as it pertains to its enablement and structure. That is, in the depicted example, each row contains a data category label (e.g., string), a Boolean selectable toggle (e.g., a button as depicted), and a selectable interaction point (e.g., a button as depicted), which enables the user 102 to further narrow the data category. For example, section row 710 defines an operative view of a data category for sports (e.g., for the method 200). Accordingly, section row 710 indicates that data categorized as relating to sports will be shared with XYZ.COM (e.g., with an optional button to further narrow sports into other subsets, such as golf and football). Similarly, section row 712 indicates that data categorized as relating to Food will not be shared with XYZ.com (e.g., with an optional button to further narrow food into other subsets, such as food types or food distinctions—cooking recipes and favorite restaurants). Section row 714 indicates that data categorized as relating to travel will not be shared with XYZ.COM (e.g., with an optional button to further narrow travel into other subsets, such as destinations and activities).

The generated graphical user interface 700 further depicts a "BACK" button 716. The button 716 is depicted as a selectable (e.g., clickable) button of the generated graphical user-interface that transitions the user 102 back to a previous display (not depicted), without initiating process 208 of method 200.

The "SUBMIT" button 718 is depicted as a selectable (e.g., clickable) button of the generated graphical user interface, which in response to being selected, initiates process 208 of method 200. Accordingly, the data category selections represented by the operative view of section rows 710, 712, and 714 may subsequently be utilized in the process of data sharing and permissioning (e.g., as discussed above, with reference to FIG. 2).

Figure 8:
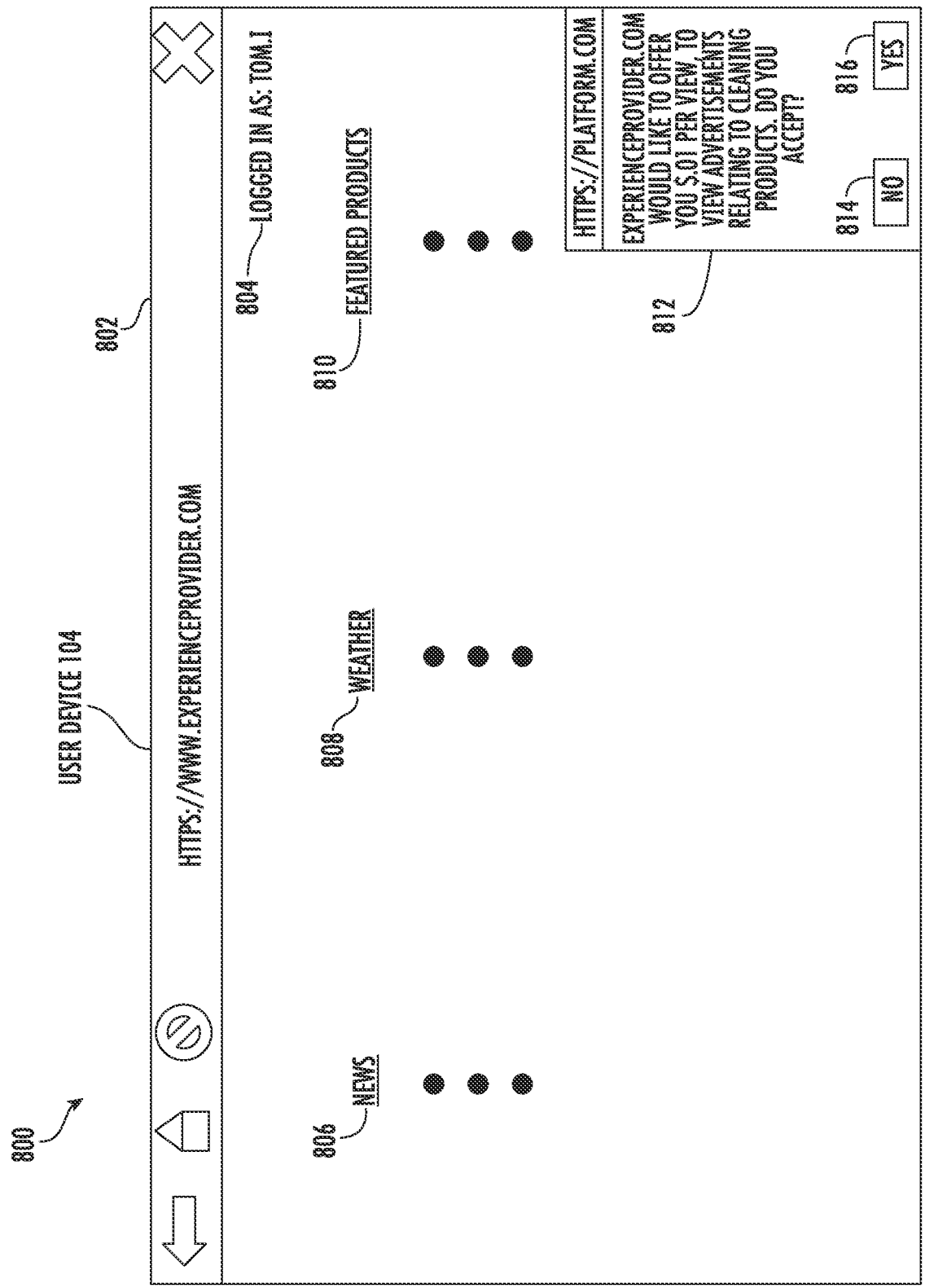
FIG. 8 is an illustration of a dynamic graphical user interface displayed on a user device while accessing experience provider content using a data sharing protocol, according to an example embodiment.

Now referring to FIG. 8, an illustrative example of a user device 104 display 800 accessing experience provider content while using a data sharing protocol is shown, according to an example embodiment. In the depicted embodiment, the display 800 includes a web browser 802 accessing experience provider content (e.g., a website).

The display 800 further includes an account notification 804; content columns 806, 808, and 810; a secure pop-up 812; a "NO" button 814; and a "YES" button 816. The account notification 804 is depicted as text (e.g., string) that informs the user 102 of the currently logged in account (e.g., logged into the experience provider website). Therefore, as depicted, the account notification 804 informs the user 102 that the experience provider content is currently being accessed under the data sharing and permissioning settings of "TOM.I".

The content columns 806, 808, and 810 include a textual (e.g., string) and categorical title with correlating content (abstracted as vertical ellipses in the depiction). Accordingly, content column 806 contains news content, content column 808 contains weather content, and content column 810 contains featured products (e.g., advertisements).

The secure pop-up 812 is depicted as showing an example offer from the experience provider to view an advertising category, such as is described in process 412 of the method 400. That is, the secure pop-up is depicted as an SSL encrypted connection to the platform computing system 122, appearing on an experience provider component (e.g., the experience provider website). As depicted, the secure pop-up 812 prompts the user 102 with an offer of the experience provider to share revenue (e.g., 1 cent per view) for advertisements relating to cleaning products. Accordingly, the display 800 further includes buttons associated with the secure pop-up 812. The associated buttons are shown as a "NO" button 814 and a "YES" button 816. The "NO" button 814 is depicted as a selectable (e.g., clickable) button, which may be selected by the user 102 in order to decline the offer. The "YES" button 816 is depicted as a selectable (e.g., clickable) button, which may be selected by the user 102 in order to accept the offer. Accordingly, the "YES" button 816 may initiate, for example, process 416 of the method 400.

Figure 9:
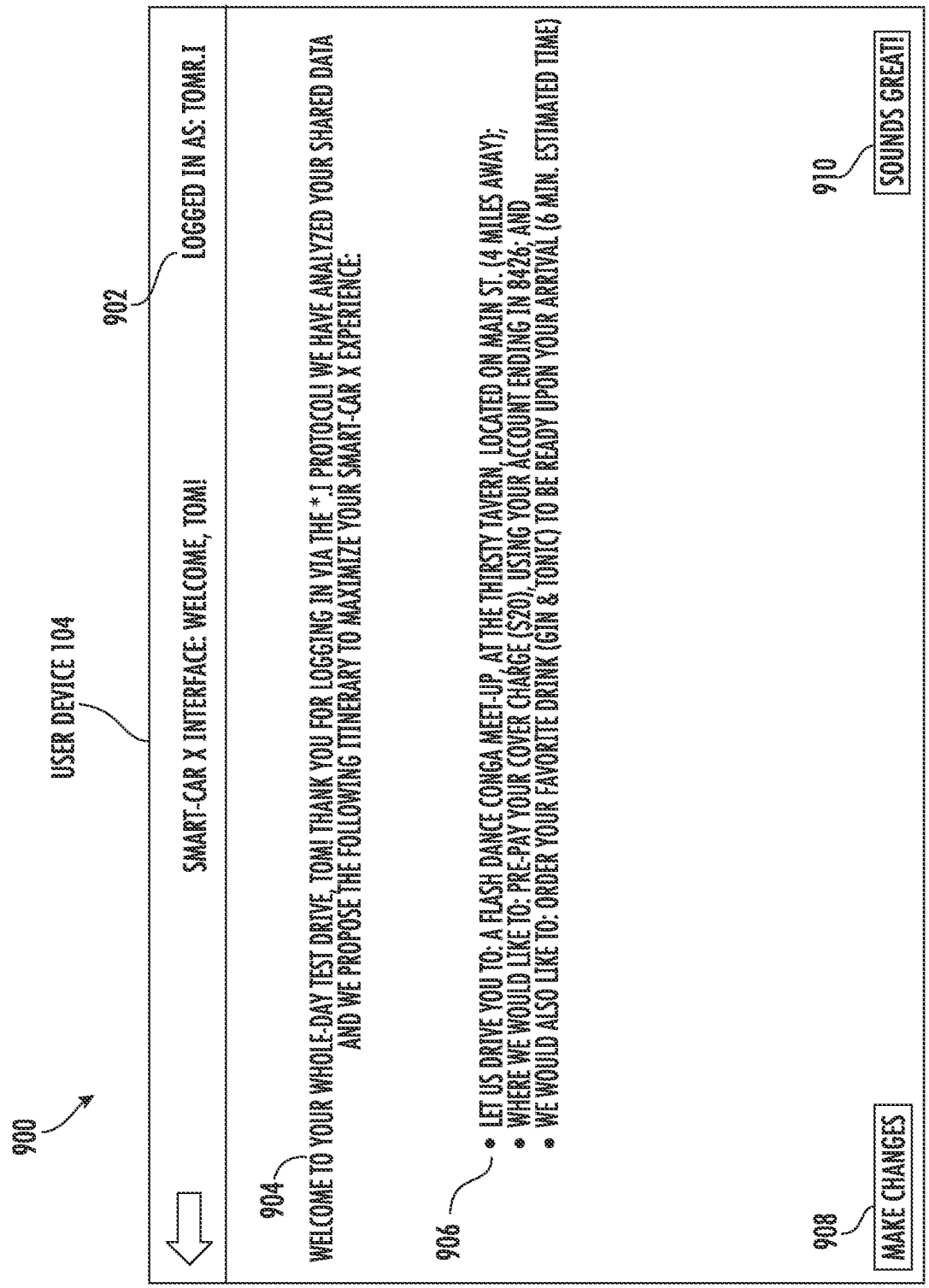
FIG. 9 is an illustration of a dynamic graphical user interface displayed on a user device while interacting with an experience provider computing system using the data sharing protocol, according to an example embodiment.

Now referring to FIG. 9, an illustrative example of a user device 104 display 900 interacting with an experience provider computing system 150 while using the data sharing protocol is shown, according to an example embodiment. In the depicted embodiment, the user device 104 is a smart car, and the display 900 is an interface of the smart car (e.g., a touchscreen).

The display 900 includes an account notification 902, a welcome message 904, an itinerary 906 generated based on the data sharing and permissioning protocol of the platform 120, a "MAKE CHANGES" button 908, and a "SOUNDS GREAT!" button 910. The account notification 902 is depicted a text (e.g., string) that informs the user 102 of the currently logged in account (e.g., logged into the smart car interface). Therefore, as depicted, the account notification 902 informs the user 102 that the smart car is currently utilizing the data sharing and permissioning settings of "TOMR.I".

The generated itinerary 906 (e.g., generated based on data shared from the TOMR.I account) is depicted as a series of textual (e.g., string) proposals for the user 102. Namely, the generated itinerary 906 informs the user 102 that the smart car has deduced (e.g., based on the shared data of the user 102) that the user 102 may enjoy an impromptu trip to the local tavern, where a flash dance conga meet-up is about to occur. The smart car may deduce these items based on the data shared from the TOMR.I account, such as through analysis of the user's 102: social media posts (e.g., gathered via web scraping as discussed in FIG. 3), data the user 102 manually entered during registration (e.g., as discussed in FIG. 3), internet history (e.g., activity data of the user 102, including updated activity data such as is discussed in FIG. 2), and transaction history (e.g., as discussed in FIG. 3). For example, the smart car may identify that the user 102 has many social media posts relating to dancing, an internet search history that indicates many recent searches about flash mobs, and a transaction history indicating that the user 102 often orders the same drink at various locations (e.g., a favorite drink). Accordingly, the smart car proposes to set the local tavern (e.g., the Thirsty Tavern) as a self-driving destination, pre-pay a cover charge for the user 102, and order ahead so that the favorite drink of the user 102 is ready upon arrival.

The display 900 further depicts a "MAKE CHANGES" button 908 and a "SOUNDS GREAT!" button 910. The "MAKE CHANGES" button 908 is depicted as a selectable (e.g., clickable) button, which may be selected by the user 102 in order to make changes to the proposed itinerary (e.g., cancel, add, or alter aspects of the itinerary). The "SOUNDS GREAT!" button is depicted as a selectable (e.g., clickable) button, which may be selected by the user 102 in order to accept the proposed itinerary (and commence according to the protocol of the experience provider smart car).

Figure 10:
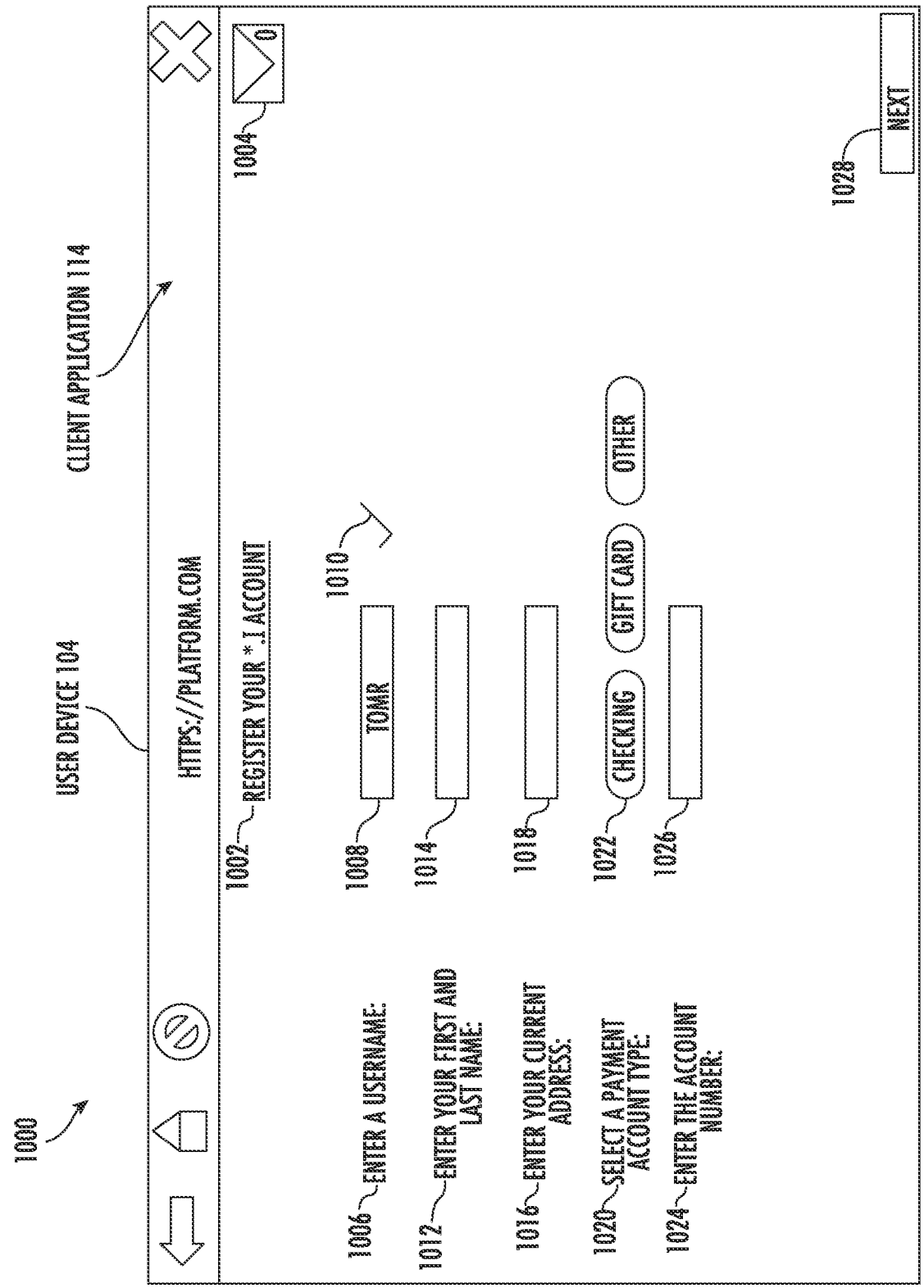
FIG. 10 is an illustration of a dynamic graphical user interface displayed on a user device during a registration process of a data sharing and permissioning service, according to an example embodiment.

Referring now to FIG. 10, an illustrative example of a dynamic graphical user interface 1000, displayed on the user device 104 during a registration process of the data sharing and permissioning service (e.g., of the platform 120) is shown, according to an example embodiment. In the depicted embodiment, the user device 104 includes a display showing the graphical user interface 1000 (e.g., provided by the client application 114, via the interface circuit 136), which is structured to facilitate a user (e.g., the user 102) to register for the data sharing and permissioning service of the platform 120.

As shown, the graphical user interface 1000 includes a registration interface title 1002; a dynamically adjusted messaging center icon 1004; registration input prompts 1006, 1012, 1016, 1020, and 1024; registration input fields 1008, 1014, 1018, 1022, and 1026; a dynamically generated input validator 1010; and a "NEXT" button 1028.

The registration interface title 1002 is depicted as a textual (e.g., string) title that identifies (e.g., to the user 102) the contents of the interface as pertaining to a *.i (e.g., the data sharing and permissioning service of the platform 120, as described herein) account registration. The dynamically adjusted messaging center icon 1004 is depicted as a selectable icon containing a dynamically adjusted (e.g., contrast, increment, decrement) numerical counter. As shown, the dynamically adjusted messaging center icon 1004 includes a grayed-out (e.g., contrasted) zero, thus indicating to the user 102 that the messaging center is currently not-applicable (e.g., as the user 102 is still in the registration phase).

The registration input prompts 1006, 1012, 1016, 1020, and 1024 are depicted as textual (e.g., string) statements that inform the user 102 what to input in the correlated registration input fields 1008, 1014, 1018, 1022, and 1026. Accordingly, registration input prompt 1006 informs the user 102 that the registration input field 1008 is for entering a username (e.g., "TOMR" as shown). Furthermore, registration input prompt 1006 and the correlated registration input field 1008 are depicted as being associated with the dynamically generated input validator 1010. The dynamically generated input validator 1010 is depicted as a checkmark, which indicates to the user 102 that the username entered in the registration input field 1008 is available for registration (e.g., "TOMR"). However, it should be appreciated that prior to entering a username or after entering a username that has already been claimed, the dynamically generated input validator 1010 is not shown to the user 102 (e.g., dynamically generated).

Continuing on, registration input prompt 1012 informs the user 102 that the registration input field 1014 is for entering a first name and a last name (e.g., of the user 102). Similarly, registration input prompt 1016 informs the user 102 that the registration input field 1018 is for entering a current address (e.g., of the user 102).

Registration input prompt 1020 informs the user 102 that the registration input field 1022 is for selecting a payment account type (e.g., depicted as selectable buttons, labeled "CHECKING", "GIFT CARD", and "OTHER"). Lastly, registration input prompt 1024 informs the user 102 that the registration input field 1026 is for entering the account number of the payment account selected at 1022. The graphical user interface 1000 also depicts a "NEXT" button 1028. The "NEXT" button 1028 is depicted as a selectable (e.g., clickable) button, which may be selected by the user 102 in order to submit the inputs and proceed to the next step of the registration process (e.g., such as is described in the method 300).

Referring now to FIG. 11, an illustrative example of a dynamic graphical user interface 1100 for a message center, displayed on the user device 104 is shown, according to an example embodiment. In the depicted embodiment, the user device 104 includes a display showing a graphical user interface 1100 (e.g., provided by the client application 114, via the interface circuit 136), which is structured to facilitate a user (e.g., the user 102) to view and respond to alerts and notifications (e.g., messages).

As shown, the graphical user interface 1100 includes an interface title 1102; a dynamically adjusted messaging center icon 1104; message selection checkboxes 1106, 1108, and 1110; selectable message subject lines 1112, 1114, and 1116; a "DELETE" button 1118; and a "HOME" button 1120.

The interface title 1102 is a textual (e.g., string) title that identifies the contents of the display. Accordingly, the interface title 1102, "MESSAGE CENTER", identifies the contents of the display as pertaining to alerts and notifications (e.g., for the user 102). The dynamically adjusted messaging center icon 1104 is depicted as a selectable icon containing a dynamically adjusted (e.g., contrast, increment, decrement) numerical counter. As shown, the dynamically adjusted messaging center icon 1104 includes a darkly-contrasted (e.g., not grayed-out as in FIG. 10) numerical three, thus indicating that the messaging center has 3 unviewed messages for the user 102. Furthermore, it should be appreciated that the user 102 may select (e.g., click) the dynamically adjusted messaging center icon 1104 on any interface of the client application 114 that displays it, and subsequently be shown the graphical user interface of 1100 (e.g., display the message center).

The message selection checkboxes 1106, 1108, and 1110 correlate to the selectable message subject lines 1112, 1114, and 1116. That is, the message selection checkboxes are depicted as selectable (e.g., clickable) checkboxes, which when selected by the user 102, identify a message associated with the correlated selectable message subject line for an operation (e.g., as further discussed below). For example, the user 102 may select the checkbox 1106 in order to identify the message associated with the selectable message subject line 1112 for a future operation.

The selectable message subject lines 1112, 1114, and 1116 are depicted as selectable rows containing a textual (e.g., string) subject (e.g., the subject of the associated message). For example, the selectable message subject line 1112 "WELCOME TO THE *.I DATA SHARING FAMILY!" may be selected (e.g., clicked) by the user 102, thus causing the client application 114 to display a welcome message associated with the subject line 1112 (e.g., via a pop-up or an interface transition to another page). Accordingly, the selectable message subject line 1114, "TIPS FOR MAKING YOUR FINANCIAL ACCOUNTS MORE SECURE WITH THE *.I PROTOCOL" may be selected (e.g., clicked) by the user 102, thus causing the client application 114 to display a tips article associated with the subject line 1114. Similarly, the selectable message subject line 1116, "OFFER TO SHARE ADVERTISING REVENUE FROM EXPERIENCE PROVIDER. COM." may be selected (e.g., clicked) by the user 102, thus causing the client application 114 to display a revenue sharing offer associated with the subject line 1116 (e.g., as described herein, with reference to FIG. 5).

The "DELETE" button 1118 is depicted as a selectable (e.g., clickable) button, which may be selected by the user 102 in order to delete any messages identified by user selections of the message selection checkboxes 1106, 1108, and 1110. For example, subsequent to viewing the welcome message associated with the selectable message subject line 1112, the user 102 may decide to delete the welcome message via the checkbox 1106 and the "DELETE" button 1118. It should be appreciated that the "DELETE" button 1118 may be used in batch operations, such that any number of message selection checkboxes may be selected by the user 102 and subsequently deleted in one click.

The "HOME" button 1120 is depicted as a selectable (e.g., clickable) button, which may be selected by the user 102 in order to return to a home screen of the client application 114 (not shown).

While this specification contains many specific implementation details and/or arrangement details, these should not be construed as limitations on the scope of any inventions or of what may be claimed, but rather as descriptions of features specific to particular implementations and/or arrangements of the systems and methods described herein. Certain features that are described in this specification in the context of separate implementations and/or arrangements can also be implemented and/or arranged in combination in a single implementation and/or arrangement. Conversely, various features that are described in the context of a single implementation and/or arrangement can also be implemented and arranged in multiple implementations and/or arrangements separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

It should be understood that no claim element herein is to be construed under the provisions of 35 U.S.C. § 112(f), unless the element is expressly recited using the phrase "means for."

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM), etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A system comprising:
   a first application programming interface (API) configured to:
   receive an input to configure a data sharing permission for a data sharing service;
   a second API configured to:
   gather, from a plurality of computing systems, data of a user;
   receive, from a plurality of experience providers, an API response containing the data of the user according to data held by each of the plurality of experience providers;
   aggregate the data of the user gathered from the plurality of computing systems and the data of the user received from the plurality of experience providers;
   a third API configured to:
   classify the aggregated data of the user according to a classification scheme, wherein the classification scheme comprises rules for multiple levels of granularity such that the data of the user is classified for a plurality of overlapping data categories;
   generate a user data corpus comprising the classified aggregated data of the user; and
   provide the user with selectable data categories responsive to the input to configure the data sharing permission, the selectable data categories based on the user data corpus.

2. The system of claim 1, wherein the data of the user gathered from the plurality of computing systems comprises responses of the user to a questionnaire provided to the user at a time of registration for the data sharing service.

3. The system of claim 1, wherein the system is operated by a financial institution, and wherein the data of the user gathered from the plurality of computing systems comprises financial data held by the financial institution and associated with the user.

4. The system of claim 1, the second API further configured to receive a credential of the user, the credential of the user being associated with a social media account of the user, wherein the system uses the credential to perform a web-scrape of the social media account of the user, and wherein data harvested via the web-scrape is aggregated and classified into the user data corpus.

5. The system of claim 1, wherein the data of the user comprises user search history, browsing history, image postings, file uploads and downloads, file metadata, transaction history, and location history.

6. The system of claim 1, wherein the classification scheme is provided by the system at periodic intervals.

7. The system of claim 1, wherein the classification scheme is specific to the user and based on at least one preference of the user.

8. The system of claim 1, wherein the classification scheme is based on an origin of the data of the user.

9. A method comprising:
   receiving, by a first application programming interface (API), an input to configure a data sharing permission for a data sharing service;
   gathering, by a second API from a plurality of computing systems, data of a user;
   receiving, by the second API from a plurality of experience providers, an API response containing the data of the user according to data held by each of the plurality of experience providers;
   aggregating, by the second API, the data of the user gathered from the plurality of computing systems and the data of the user received from the plurality of experience providers;
   classifying, by a third API, the aggregated data of the user according to a classification scheme, wherein the classification scheme comprises rules for multiple levels of granularity such that the data of the user is classified for a plurality of overlapping data categories;
   generating, by the third API, a user data corpus comprising the classified aggregated data of the user; and
   providing, by the third API, the user with selectable data categories responsive to the input to configure the data sharing permission, the selectable data categories based on the user data corpus.

10. The method of claim 9, wherein the data of the user gathered from the plurality of computing systems comprises responses of the user to a questionnaire provided to the user at a time of registration for the data sharing service.

11. The method of claim 9, wherein the first API, the second API, and the third API are operated by a financial institution, and wherein the data of the user gathered from the plurality of computing systems comprises financial data held by the financial institution and associated with the user.

12. The method of claim 9, further comprising receiving, by the second API, a credential of the user, the credential of the user being associated with a social media account of the user, wherein the second API uses the credential to perform a web-scrape of the social media account of the user, and wherein data harvested via the web-scrape is aggregated and classified into the user data corpus.

13. The method of claim 9, wherein the data of the user comprises user search history, browsing history, image postings, file uploads and downloads, file metadata, transaction history, and location history.

14. The method of claim 9, wherein the classification scheme is provided at periodic intervals.

15. The method of claim 9, wherein the classification scheme is specific to the user and based on at least one preference of the user.

16. The method of claim 9, wherein the classification scheme is based on an origin of the data of the user.

17. A non-transitory computer readable media having computer-executable instructions embodied therein that, when executed by a server system, causes the server system to perform operations comprising:

receiving, by a first application programming interface (API), an input to configure a data sharing permission for a data sharing service;

gathering, by a second API from a plurality of computing systems, data of a user;

receiving, by the second API from a plurality of experience providers, an API response containing the data of the user according to data held by each of the plurality of experience providers;

aggregating, by the second API, the data of the user gathered from the plurality of computing systems and the data of the user received from the plurality of experience providers;

classifying, by a third API, the aggregated data of the user according to a classification scheme, wherein the classification scheme comprises rules for multiple levels of granularity such that the data of the user is classified for a plurality of overlapping data categories;

generating, by the third API, a user data corpus comprising the classified aggregated data of the user; and providing, by the third API, the user with selectable data categories responsive to the input to configure the data sharing permission, the selectable data categories based on the user data corpus.

18. The non-transitory computer readable media of claim 17, wherein the data of the user gathered from the plurality of computing systems comprises responses of the user to a questionnaire provided to the user at a time of registration for the data sharing service.

19. The non-transitory computer readable media of claim 17, wherein the first API, the second API, and the third API are operated by a financial institution, and wherein the data of the user gathered from the plurality of computing systems comprises financial data held by the financial institution and associated with the user.

20. The non-transitory computer readable media of claim 17, wherein the instructions, when executed by the server system, further causes the server system to receive, by the second API, a credential of the user, the credential of the user being associated with a social media account of the user, wherein the second API uses the credential to perform a web-scrape of the social media account of the user, and wherein data harvested via the web-scrape is aggregated and classified into the user data corpus.

\* \* \* \* \*